US010200701B2

(12) United States Patent
Bugdayci Sansli et al.

(10) Patent No.: US 10,200,701 B2
(45) Date of Patent: Feb. 5, 2019

(54) HDR AND WCG CODING ARCHITECTURE WITH SDR BACKWARDS COMPATIBILITY IN A SINGLE BITSTREAM FOR VIDEO CODING

(71) Applicant: QUALCOMM Incorporated, San Diego, CA (US)

(72) Inventors: Done Bugdayci Sansli, La Jolla, CA (US); Sungwon Lee, San Diego, CA (US); Dmytro Rusanovskyy, San Diego, CA (US); Joel Sole Rojals, San Diego, CA (US); Adarsh Krishnan Ramasubramonian, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 15/293,199

(22) Filed: Oct. 13, 2016

(65) Prior Publication Data

US 2017/0111643 A1 Apr. 20, 2017

Related U.S. Application Data

(60) Provisional application No. 62/241,686, filed on Oct. 14, 2015.

(51) Int. Cl.
*H04N 19/30* (2014.01)
*H04N 19/184* (2014.01)
(Continued)

(52) U.S. Cl.
CPC .......... *H04N 19/30* (2014.11); *H04N 19/184* (2014.11); *H04N 19/186* (2014.11); *H04N 19/46* (2014.11)

(58) Field of Classification Search
CPC .... H04N 19/30; H04N 19/184; H04N 19/186; H04N 19/46
See application file for complete search history.

(56) References Cited

U.S. PATENT DOCUMENTS

2004/0196297 A1* 10/2004 Elliott ................. G06F 3/14
345/613
2007/0091213 A1* 4/2007 Jaspers ................ H04N 9/68
348/687

(Continued)

FOREIGN PATENT DOCUMENTS

EP 2109321 A2 10/2009

OTHER PUBLICATIONS

Auyeung et al., "Color Gamut Scalable Video Coding with Piecewise Linear Predictions," JCT-3V meeting; MPEG meeting; Jul. 29-Aug. 2, 2013; The Joint Collaborative Team on 3D Video Coding Extension Development of ISO/IEC JTC1/SC29/WG11 and ITU-T SG.16, Jul. 2013, Document No. JCTVC-N0271, 3 pp.

(Continued)

*Primary Examiner* — Joseph Suh
(74) *Attorney, Agent, or Firm* — Shumaker & Sieffert, P.A.

(57) ABSTRACT

Techniques are described for processing video data to conform to a high dynamic range (HDR)/wide color gamut (WCG) color container. Operations may be applied to video data in certain color spaces to enable compression of High Dynamic Range (HDR) and Wide Color Gamut (WCG) video in such a way that an existing receiver without HDR and WCG capabilities would be able to display a viewable Standard Dynamic Range (SDR) video from the received bitstream without any additional processing. Certain embodiments enable delivery of a single bitstream from which an existing decoder obtains the viewable SDR video directly and an HDR capable receiver reconstruct the HDR (Continued)

and WCG video by applying the specified processing. Such embodiments may improve the compression efficiency of hybrid based video coding systems utilized for coding HDR and WCG video data.

14 Claims, 17 Drawing Sheets

(51) Int. Cl.
   *H04N 19/186* (2014.01)
   *H04N 19/46* (2014.01)

(56) References Cited

U.S. PATENT DOCUMENTS

| | | | | |
|---|---|---|---|---|
| 2010/0080287 | A1* | 4/2010 | Ali | H04L 1/0015 375/240.03 |
| 2011/0090959 | A1* | 4/2011 | Wiegand | H04N 19/593 375/240.12 |
| 2011/0251905 | A1* | 10/2011 | Lawrence | G03H 1/0005 705/15 |
| 2012/0072609 | A1* | 3/2012 | Rajamani | H04N 21/4122 709/231 |
| 2014/0029846 | A1* | 1/2014 | Su | G09G 3/2048 382/166 |
| 2015/0195587 | A1* | 7/2015 | Tsukagoshi | H04N 21/2362 725/116 |
| 2017/0085896 | A1* | 3/2017 | Ramasubramonian | H04N 19/70 |

OTHER PUBLICATIONS

International Search Report and Written Opinion of International Application No. PCT/US2016/057057, dated Dec. 20, 2016, 16 pp.
Khan et al.,"HDR Image Encoding using Reconstruction Functions based on Piecewise Linear Approximations," Multimedia Systems, ACM, New York, NY, US, Nov. 13, 2014, vol. 21(6), pp. 615-624, XP035535856, ISSN: 0942-4962, DOI: 10.1007/500530-014-0437-2, Retrieved on Nov. 13, 2014, 10 pp.
Mai et al.,"On-the-fly Tone Mapping for Backward-compatible High Dynamic Range Image/video Compression," IEEE International Symposium on Circuits and Systems, ISCAS, May 30-Jun. 2, 2010, Paris, France, IEEE, US, May 30, 2010, pp. 1831-1834, XP031724997, ISBN: 978-1-4244-5308-5, 4 pp.
Naccari et al., "High Dynamic Range Compatibility Information SEI Message," JCT-VC Meeting; Jun. 19-26, 2015; Warsaw; Joint Collaborative Team on Video Coding of ISO/IEC JTC1/SC29/WG11 and ITU-T SG.16; Retrieved from URL: http://wftp3.itu.int/av-arch/jctvc-site/, No. JCIVC-U0033, Jun. 9, 2015, 9 pp.
Qualcomm Incorporated, "Dynamic Range Adjustment SEI to Enable High Dynamic Range Video Coding with Backward-Compatible Capability", ITU-T SG16 Meeting; Oct. 12-23, 2015; Geneva, No. T13-SG16-C-1027, Sep. 29, 2015, 11 pp.
Ramasubramonian et al., "Clarifications on the Semantics of CRI SEI Message and its Usage for HDR/WCG Video Compression," JCT-VC Meeting; Oct. 15-21, 2015; Geneva; Joint Collaborative Team on Video Coding of ISO/IEC JTC1/SC29/WG11 and ITU-T SG.16; Retrieved from URL: http://wftp3.itu.int/av-arch/jctvc-site/ ,, No. JCTVC-V0064, Oct. 6, 2015, 3 pp.
Rusanovskyy et al.,"Report on CE2.1.3 test: Single-layer HDR Video Coding based on m36256," Mpeg Meeting; Oct. 19-23, 2015; Geneva; Motion Picture Expert Group or ISO/IEC JTC1/SC29/WG11, No. m37064, Oct. 10, 2015, 13 pp.
Sansli et al., "Dynamic Range Adjustment SEI", JCT-VC Meeting; Jun. 19-26, 2015; Warsaw; Joint Collaborative Team on Video Coding of ISO/IEC JTC1/SC29/WG11 and ITU-TSG.16; Retrieved from URL:http://wftp3.itu.int/av-arch/jctvc-site/, No. JCTVC-U0098-v2, Jun. 25, 2015, 6 pp.
Segall et al., "Tone Mapping SEI," JVT Meeting; Mar. 31-Apr. 7, 2006; Geneva, CH; Joint Video Team of ISO/IEC JTC1/SC29/WG11 and ITU-T SG.16, No. JVT-5087, Apr. 1, 2006, 12 pp.
Winken et al.,"CE2: SVC bit-depth Scalability," JVT Meeting; MPEG Meeting; Jun. 29-Jul. 5, 2007; Geneva, CH; Joint Video Team of ISO/IEC JTC1/5C29/WG11 and ITU-T SG.16, No. JVT-X057, Jul. 4, 2007, 15 pp.
Francois et al.,"Signalling, Backward Compatibility and Display Adaptation for HDR/WCG Video Coding, Draft 1," Joint Collaborative Team on Video Coding (JCT-VC) of ITU-T SG 16 WP 3 and ISO/IEC JTC 1/SC 29/WG11, JCTVC-Y1012-v2, Mar. 16, 2017, 30 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.
ITU-T H.261, Line Transmission of Non-Telephone Signals, Video Codec for Audiovisual Services At p x 64 kbits, The International Telecommunication Union, Mar. 1993, 29 pp.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
"High Dynamic Range Electro-Optical Transfer Function of Mastering Reference Displays," SMPTE ST 2084:2014; SMPTE Standar; Aug. 16, 2014, 14 pp.
Luthra et al., "Call for Evidence (CfE) for HDR and WCG Video Coding", MPEG document M36131, ISO/IEC JTC1/SC29/WG11 MPEG2014/N15083, Switzerland, Feb. 2015, 46 pp.
"Parameter values for ultra-high definition television systems for production and international programme exchange," Recommendation ITU-R BT.2020-2, ITU-R Radiocommunication Section of ITU, Geneva, Oct. 2015, 8 pp.
Rusanovskyy et.al., "Single layer non-normative (category 3a) NCL and CL responses to the Call for Evidence on HDR/WCG," MPEG document m36256, Warsaw, Poland, Jun. 2015, 9 pp.
Cotton et al., "BBC's response to CfE for HDR Video Coding (Category 3a)", British Broadcasting Corporation (BBC), International Organisation for Standardisation Organisation Internationale De Normalisation ISO/IEC JTC1/SC29/WG11 Coding of Moving Pictures and Audio, ISO/IEC JTC1/SC29/WG11 M36249, Jun. 22-26, 2015, Warsaw, Poland, Jun. 18, 2015, 22 pp.
Goris et al., "Philips Response to CfE for HDR and WCG", Philips, International Organisation for Standardisation Organisation Internationale De Normalisation, ISO/IEC JTC1/SC29/WG11 Coding of Moving Pictures and Audio, Jul. 2015, MPEG2015/M36266, Jun. 23, 2015, 16 pp.
"Parameter values for the HDTV standards for production and international programme exchange," Recommendation ITU-R BT.709-5, Apr. 2002, ITU-R Radiocommunication Sector of ITU, BT Series, Broadcasting service (television), International Telecommunication Union, Geneva, 2009, 32 pp.
"Image parameter values for high dynamic range television for use in production and international programme exchange," Recommendation ITU-R BT.2100-0, Jul. 2016, ITU-R Radiocommunication Sector of ITU, BT Series, Broadcasting service (television), International Telecommunication Union, Geneva, 2016, 17 pp.
"Reference electro-optical transfer function for flat panel displays used in HDTV studio production", Recommendation ITU-R BT.1886,

(56) References Cited

OTHER PUBLICATIONS

Mar. 2011, ITU-R Radiocommunication Sector of ITU, BT Series, Broadcasting service (television), International Telecommunication Union, Geneva, 2011, 7 pp.

"Camera Aperture Image and Usage" SMPTE Standard for Motion-Picture Film (8-mm Type R), SMPTE-231-2004, Society of Motion Picture and Television Engineers, Nov. 8, 2004, 4pp.

Lasserre, et al., "Technicolor's response to CfE for HDR and WCG (category 1)—Single layer HDR video coding with SDR backward compatibility", International Organisation for Standardisation Organisation Inernaitonale De Normalisation; ISO/IEC JTC1/SC29/WG11; Coding of Moving Pictures and Audio, ISO/IEC JTC1/SC29/WG11 MPEG document m36263, Warsaw, Poland, Jun. 2015; 20 pp.

Lasserre, et al., "Technicolor's response to CfE for HDR and WCG (category 1)—Single layer HDR video coding with SDR backward compatibility", International Organisation for Standardisation Organisation Inernaitonale De Normalisation; ISO/IEC JTC1/SC29/WG11; Coding of Moving Pictures and Audio, ISO/IEC JTC1/SC29/WG11 MPEG document m36263r1, Warsaw, Poland, Jun. 2015; 21 pp.

Second Written Opinion from International Application No. PCT/US2016/057057, dated Sep. 1, 2017, 6 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

Boyce, et al., "Draft high efficiency video coding (HEVC) version 2, combined format range extensions (RExt), scalability (SHVC), and multi-view (MV-HEVC) extensions," Jun. 30-Jul. 9, 2014; (Joint Collaborative Team on Video Coding of ISO/IEC JTC1/SC29/WG11 and ITU-T SG.16); doc. No. JCTVC-R1013_v6, 541 pp.

International Preliminary Report on Patentability from International Application No. PCT/US2016/057057, dated Jan. 8, 2018, 10 pp.

\* cited by examiner

Example of EOTFs

HDR AND WCG CODING ARCHITECTURE WITH SDR BACKWARDS COMPATIBILITY IN A SINGLE BITSTREAM FOR VIDEO CODING

This application claims the benefit of U.S. Provisional Application No. 62/241,686, filed Oct. 14, 2015, the entire content of each is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to processing video data, including processing video data to conform to a high dynamic range (HDR)/wide color gamut (WCG) color container. As will be explained in more detail below, the techniques of the disclosure describe embodiments that specify operations applied to video data in certain color spaces to enable compression of HDR and WCG video in such a way that an existing receiver without HDR and WCG capabilities would be able to display a viewable Standard Dynamic Range (SDR) video from the received bitstream without any additional processing. Therefore, certain embodiments enable delivery of a single bitstream from which an existing decoder obtains the viewable SDR video directly and an HDR capable receiver reconstruct the HDR and WCG video by applying the specified processing. Such embodiments may improve the compression efficiency of hybrid based video coding systems utilized for coding HDR and WCG video data.

In one example, this disclosure is directed to a method of decoding video data, the method comprising: decoding video data and one or more scaling parameters of an encoded bitstream, wherein the one or more scaling parameters are configured to transform components of the video data using a piece-wise linear mapping of the video data; and outputting the decoded bitstream video data and the one or more scaling parameters.

In another example, this disclosure is directed to a method of encoding video data, the method comprising: receiving, by a video encoder, one or more scaling parameters that minimize a difference between a reference tone mapping and a piece-wise linear mapping of video data; and encoding, by the video encoder, the video data and the one or more scaling parameters to form a single bitstream.

In another example, this disclosure is directed to a device for decoding video content, the device comprising: a memory configured to store an original video and one or more processors in communication with the memory. The one or more processors are configured to decode video data and one or more scaling parameters of an encoded bitstream, wherein the one or more scaling parameters are configured to transform components of the video data using a piece-wise linear mapping of the video data; and output the decoded bitstream video data and the one or more scaling parameters.

In another example, this disclosure is directed to a device for encoding video content, the device comprising: a memory configured to store an original video; one or more processors in communication with the memory. The one or more processors are configured to receive one or more scaling parameters that minimize a difference between a reference tone mapping and a piece-wise linear mapping of video data; and encode the video data and the one or more scaling parameters to form a single bitstream.

In another example, this disclosure is directed to a video decoding device comprising: means for decoding video data and one or more scaling parameters of an encoded bitstream, wherein the one or more scaling parameters are configured to transform components of the video data using a piece-wise linear mapping of the video data; and means for outputting the decoded bitstream video data and the one or more scaling parameters.

In another example, this disclosure is directed to a video encoding device comprising: means for receiving, by a video encoder, one or more scaling parameters that minimize a difference between a reference tone mapping and a piece-wise linear mapping of video data; and means for encoding, by the video encoder, the video data and the one or more scaling parameters to form a single bitstream.

In a further example, this disclosure is directed to a non-transitory computer-readable medium having stored thereon instructions for processing video data that, when executed, cause one or more processors to decode video data and one or more scaling parameters of an encoded bitstream, wherein the one or more scaling parameters are configured to transform components of the video data using a piece-wise linear mapping of the video data; and output the decoded bitstream video data and the one or more scaling parameters.

In a further example, this disclosure is directed to a non-transitory computer-readable medium having stored thereon instructions for processing video data that, when executed, cause one or more processors to receive one or more scaling parameters that minimize a difference between a reference tone mapping and a piece-wise linear mapping of video data; and encode the video data and the one or more scaling parameters to form a single bitstream.

The details of one or more examples are set forth in the accompanying drawings and the description below. Other features, objects, and advantages will be apparent from the description, drawings, and claims.

DETAILED DESCRIPTION

This disclosure is related to the field of coding of video signals with High Dynamic Range (HDR) and Wide Color Gamut (WCG) representations. More specifically, this disclosure describes embodiments that specify operations applied to video data in certain color spaces to enable compression of HDR and WCG video in such a way that an existing receiver without HDR and WCG capabilities would be able to display a viewable Standard Dynamic Range (SDR) video from the received bitstream without any additional processing. Therefore, certain embodiments enable delivery of a single bitstream from which an existing decoder obtains the viewable SDR video directly and an HDR capable receiver reconstruct the HDR and WCG video by applying the specified processing. Such embodiments may improve the compression efficiency of hybrid based video coding systems utilized for coding HDR and WCG video data.

Video coding standards, including hybrid-based video coding standards, include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from phenix.int-evry.fr/jct/doc_end_user/documents/12_Geneva/wg11/JCTVC-L1003-v34.zip. The finalized HEVC standard is referred to as HEVC version 1.

Figure 1:
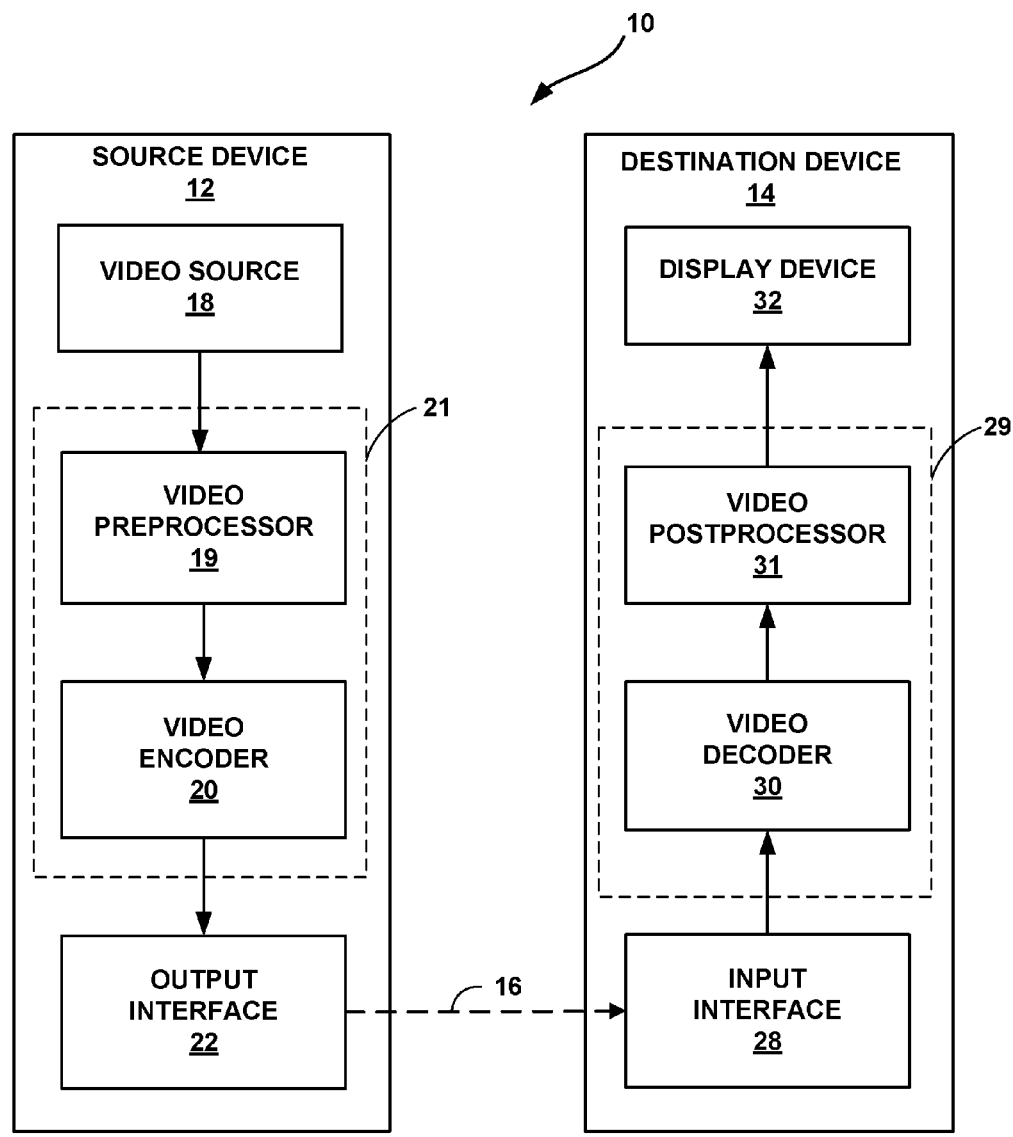
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoding unit 21, which includes video preprocessor 19 and video encoder 20, and output interface 22. Destination device 14 includes input interface 28, video decoding unit 29, which includes video decoder 30 and video postprocessor 31, and display device 32. In accordance with this disclosure, video preprocessor 19 and video postprocessor 31 may be configured to apply the example techniques described in this disclosure.

In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. For ease of description, the disclosure is described with respect to video preprocessor 19 and video postprocessor 31 preforming the example techniques described in this disclosure in respective ones of source device 12 and destination device 14. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoding unit 21. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoding unit 21, which is also used by video decoder 30 of video decoding unit 29, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As illustrated, video preprocessor 19 receives the video data from video source 18. Video preprocessor 19 may be configured to process the video data to convert it into a form that is suitable for encoding with video encoder 20. For example, video preprocessor 19 may perform dynamic range compacting (e.g., using a non-linear transfer function), color conversion to a more compact or robust color space, and/or floating-to-integer representation conversion. Video encoder 20 may perform video encoding on the video data outputted by video preprocessor 19. Video decoder 30 may perform the inverse of video encoder 20 to decode video data, and video postprocessor 31 may perform the inverse of video preprocessor 19 to convert the video data into a form suitable for display. For instance, video postprocessor 31 may perform integer-to-floating conversion, color conversion from the compact or robust color space, and/or inverse of the dynamic range compacting to generate video data suitable for display.

Video encoding unit 21 and video decoding unit 29 each may be implemented as any of a variety of fixed function and programmable circuitry such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoding unit 21 and video decoding unit 29 may be included in one or more encoders or decoders, either of which may be integrated as part of a combined encoder/decoder (CODEC) in a respective device.

Although video preprocessor 19 and video encoder 20 are illustrated as being separate units within video encoding unit 21 and video postprocessor 31 and video decoder 30 are illustrated as being separate units within video decoding unit 29, the techniques described in this disclosure are not so limited. Video preprocessor 19 and video encoder 20 may be formed as a common device (e.g., same integrated circuit or housed within the same chip or chip package). Similarly, video postprocessor 31 and video decoder 30 may be formed as a common device (e.g., same integrated circuit or used within the same chip or chip package).

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the ITU-T H.265, HEVC standard.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR (High Dynamic Range) and WCG (Wide Color Gamut). Parameters of the utilized dynamic range and color gamut are two independent attributes of video content, and their specification for purposes of digital television and multimedia services are defined by several international standards. For example, ITU-R Rec. 709 defines parameters for HDTV (high definition television), such as Standard Dynamic Range (SDR) and standard color gamut, and ITU-R Rec. 2020 specifies UHDTV (ultra-high definition television) parameters such as HDR and WCG. There are also other standards developing organization (SDOs) documents that specify dynamic range and color gamut attributes in other systems, e.g., P3 color gamut is defined in SMPTE-231-2 (Society of Motion Picture and Television Engineers) and some parameters of HDR are defined in STMPTE-2084. A brief description of dynamic range and color gamut for video data is provided below.

Dynamic range is typically defined as the ratio between the minimum and maximum brightness of the video signal. Dynamic range may also be measured in terms of 'f-stop,' where one f-stop corresponds to a doubling of the signal dynamic range. In MPEG's definition, HDR content is such content that features brightness variation with more than 16 f-stops. In some terms, levels between 10 and 16 f-stops are considered as intermediate dynamic range, but may be considered HDR in other definitions. In some examples, HDR video content may be any video content that has a higher dynamic range than traditionally used video content with a standard dynamic range (e.g., video content as specified by ITU-R Rec. BT.709). At the same time, the human visual system (HVS) is capable for perceiving much larger dynamic range. However, the HVS includes an adaptation mechanism to narrow a so-called simultaneous range.

Figure 2:
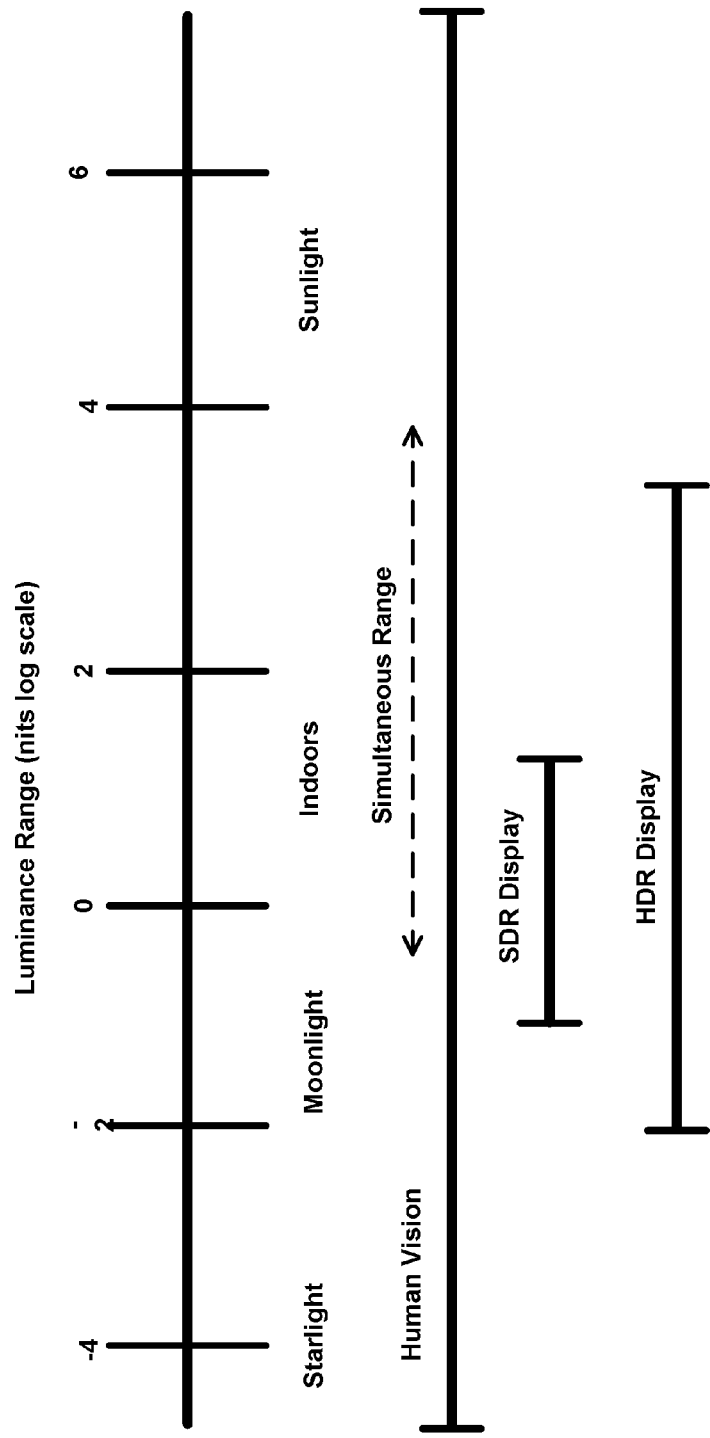
FIG. 2 is a drawing illustrating the concepts of high dynamic range (HDR) data.

Visualization of dynamic range provided by SDR of HDTV, expected HDR of UHDTV and HVS dynamic range is shown in FIG. 2.

Current video applications and services are regulated by Rec.709 and provide SDR, typically supporting a range of brightness (or luminance) of around 0.1 to 100 candelas (cd) per m2 (often referred to as "nits"), leading to less than 10 f-stops. The next generation video services are expected to provide dynamic range of up-to 16 f-stops. Although detailed specification is currently under development, some initial parameters have been specified in SMPTE-2084 and Rec. 2020.

Figure 3:
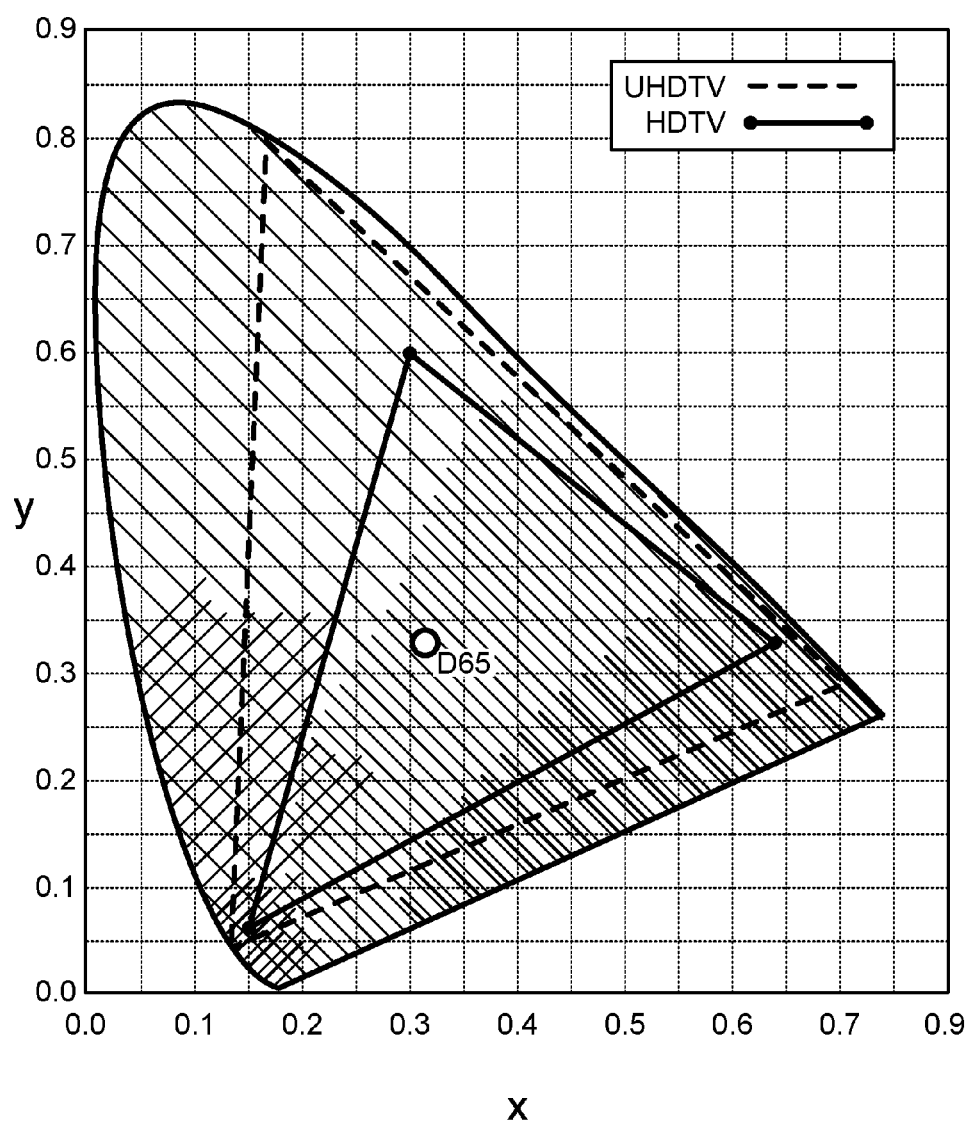
FIG. 3 is a conceptual diagram comparing of color gamuts of video signal of high definition television (HDTV) (BT.709) and ultra-high definition television (UHDTV) (BT.2020).

Another aspect for a more realistic video experience besides HDR is the color dimension, which is conventionally defined by the color gamut. FIG. 3 is a conceptual diagram showing an SDR color gamut (triangle based on the BT.709 color red, green and blue color primaries), and the wider color gamut for UHDTV (triangle based on the BT.2020 color red, green and blue color primaries). FIG. 3 also depicts the so-called spectrum locus (delimited by the tongue-shaped area), representing limits of the natural colors. As illustrated by FIG. 3, moving from BT.709 to BT.2020 color primaries aims to provide UHDTV services with about 70% more colors. D65 specifies the white color for given specifications (e.g., BT.709 and/or BT.2020 specifications).

A few examples of color gamut specifications are shown in Table 1.

TABLE 1

Color gamut parameters
RGB color space parameters

| Color space | White point | | Primary colors | | | | | |
|---|---|---|---|---|---|---|---|---|
| | $x_W$ | $y_W$ | $x_R$ | $y_R$ | $x_G$ | $y_G$ | $x_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the X and Y values of a white point, and by the X and Y values of the primary colors (e.g., red (R), green (G), and blue (B). The X and Y values represent the chromaticity (X) and the brightness (Y) of the colors, as is defined by the CIE 1931 color space. The CIE 1931 color space defines the links between pure colors (e.g., in terms of wavelengths) and how the human eye perceives such colors.

HDR/WCG is typically acquired and stored at a very high precision per component (even floating point), with the 4:4:4 chroma format and a very wide color space (e.g., CIE 1931 XYZ color space). This representation targets high precision and is (almost) mathematically lossless. However, this format feature may include a lot of redundancies and is not optimal for compression purposes. A lower precision format with HVS-based assumption is typically utilized for state-of-the-art video applications.

Figure 4:
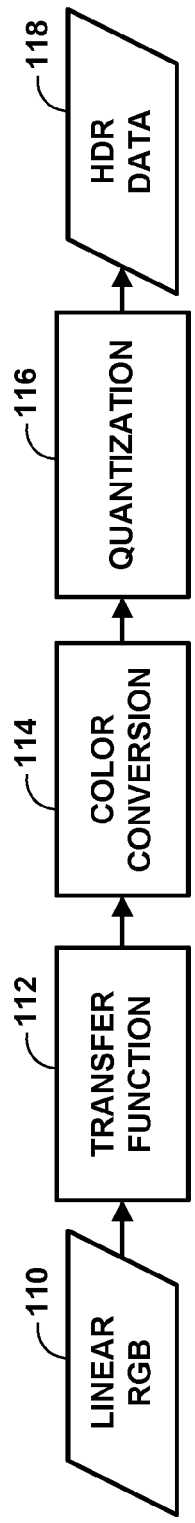
FIG. 4 is a conceptual diagram showing a HDR/WCG representation conversion.

Typical video data format conversion for purposes of compression consists of three major processes, as shown in FIG. 4. The techniques of FIG. 4 may be performed by video preprocessor 19. Linear RGB data 110 may be HDR/WCG video data and may be stored in a floating point representation. Linear RGB data 110 may be compacted using a non-linear transfer function (TF) for dynamic range compacting. For instance, video preprocessor 19 may include a transfer function unit (TF) unit 112 configured to use a non-linear transfer function for dynamic range compacting.

The output of TF unit 112 may be a set of codewords, where each codeword represents a range of color values (e.g., illumination levels). The dynamic range compacting means that the dynamic range of the linear RGB data 110 may be a first dynamic range (e.g., human vision range as illustrated in FIG. 2). The dynamic range of the resulting codewords may be a second dynamic range (e.g., HDR display range as illustrated in FIG. 2). Therefore, the codewords capture a smaller dynamic range than linear RGB data 110, and hence, TF unit 112 performs dynamic range compacting.

Figure 7:
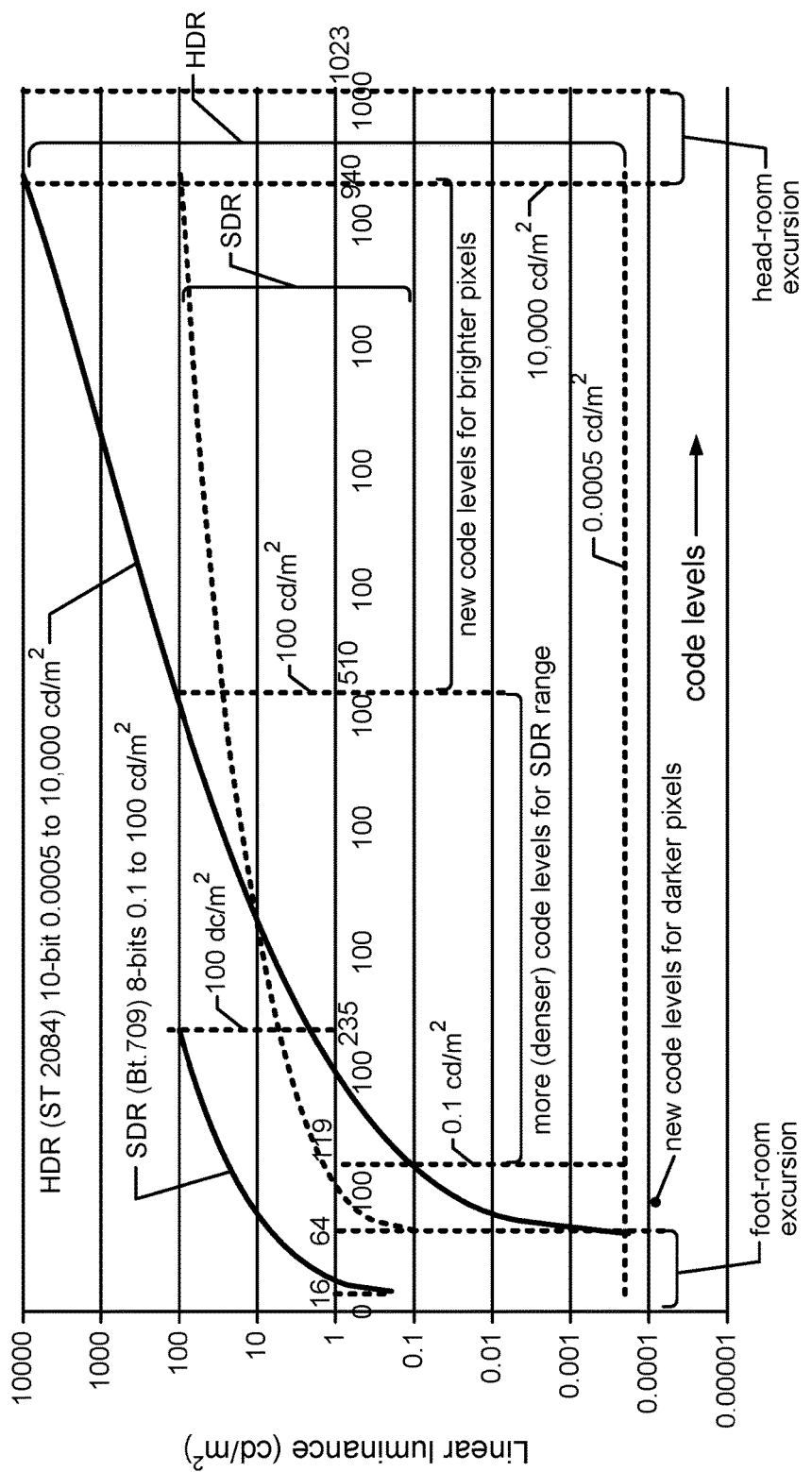
FIG. 7 is conceptual diagram showing example transfer functions.

TF unit 112 performs non-linear functions in the sense that the mapping between the codewords and the input color values is not equally spaced (e.g., the codewords are non-linear codewords). Non-linear codewords means that changes in the input color values do not manifest as linearly proportional changes in the output codewords, but as non-linear changes in the codewords. For example, if the color values represent low illumination, then small changes in the input color values would result in small changes in the codewords outputted by TF unit 112. However, if the color values represent high illumination, then relatively large changes in the input color values would be needed for small changes in the codewords. The range of illumination represented by each codeword is not constant (e.g., a first codeword is the same for a first range of illuminations and a second codeword is the same for a second range of illuminations, and the first and second ranges are different). FIG. 7, described below, illustrates the characteristic of the transfer function applied by TF unit 112.

As described in more detail, the techniques may scale and offset the linear RGB data 110 that TF unit 112 receives and/or scale and offset the codewords that TF unit 112 outputs to better utilize the codeword space. TF unit 112 may compact linear RGB data 110 (or scaled and offset RGB data) using any number of non-linear transfer functions (e.g., the PQ (perceptual quantizer) TF as defined in SMPTE-2084).

In some examples, color conversion unit 114 converts the compacted data into a more compact or robust color space (e.g., in YUV or YCrCb color space via a color conversion unit) that is more suitable for compression by video encoder 20. As described in more detail, in some examples, prior to color conversion unit 114 performing color conversion, the techniques may scale and offset the codewords that are outputted by the application of the TF by TF unit 112. Color conversion unit 114 may receive these scaled and offset codewords. In some examples, some scaled and offset codewords may be greater than or less than respective thresholds; for these, the techniques may assign a respective set codewords.

This data is then quantized using a floating-to-integer representation conversion (e.g., via a quantization unit 116) to produce the video data (e.g., HDR data 118) that is transmitted to video encoder 20 to be encoded. In this example HDR data 118 is in an integer representation. HDR data 118 may be now in a format more suitable for compression by video encoder 20. It should be understood that the order of the processes depicted in FIG. 4 is given as an example, and may vary in other applications. For example, color conversion may precede the TF process. In addition, video preprocessor 19 may apply more processing (e.g., spatial subsampling) to the color channels (or also called color components).

Accordingly, in FIG. 4, the high dynamic range of input RGB data 110 in linear and floating point representation is compacted with the utilized non-linear transfer function by TF unit 112, e.g. PQ TF as defined in SMPTE-2084, following which it is converted to a target color space (e.g., by color conversion unit 114) that is more suitable for compression, e.g. YCbCr, and then quantized (e.g., quantization unit 116) to achieve integer representation. The order of these elements is given as an example, and may vary in real-world applications, e.g., color conversion may precede the TF module (e.g., TF unit 112). Additional processing as such spatial subsampling may be applied to color channels prior to TF unit 112 applying the transfer function. Quantization unit 116 then may output converted HDR data 118. For encoding, the converted HDR data 118 may fed into any coding tool such as HEVC (e.g., encoder 20) then stored (or transmitted) in a compact representation.

Figure 5:
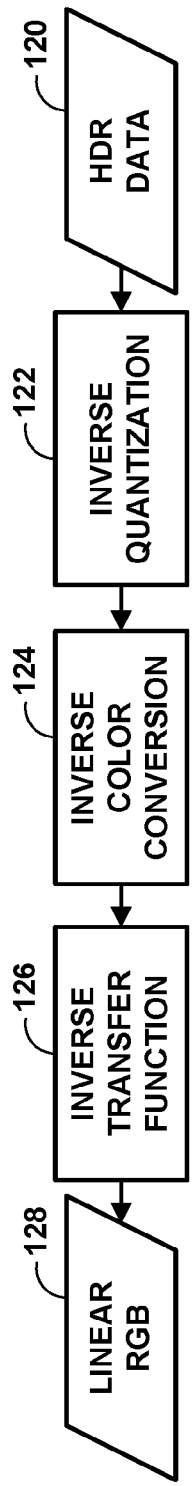
FIG. 5 is a conceptual diagram showing an HDR/WCG inverse conversion.

The inverse conversion at the decoder side is depicted in FIG. 5. The techniques of FIG. 5 may be performed by video postprocessor 31 or video decoder 30. At the decoder side, the decoded HDR data 120 is converted back to Linear RGB 128 to be realized at the target display. For example, video postprocessor 31 receives video data (e.g., HDR data 120) from video decoder 30 and inverse quantization unit 122 may inverse quantize the data, inverse color conversion unit 124 performs inverse color conversion, and inverse non-linear transfer function unit 126 performs inverse non-linear transfer to produce linear RGB data 128.

The inverse color conversion process that inverse color conversion unit 124 performs may be the inverse of the color conversion process that color conversion unit 114 performed. For example, the inverse color conversion unit 124 may convert the HDR data from a YCrCb format back to an RGB format. Inverse transfer function unit 126 may apply the inverse transfer function to the data to add back the dynamic range that was compacted by TF unit 112 to recreate the linear RGB data 128.

In the example techniques described in this disclosure, prior to the inverse transfer function unit 126 performing inverse transfer function, video postprocessor 31 may apply inverse post-processing and, after inverse transfer function unit 126 performs the inverse transfer function, may apply inverse pre-processing. For example, as described above, in some examples, video preprocessor 19 may apply pre-processing (e.g., scaling and offsetting) prior to TF unit 112 and may apply post-processing (e.g., scaling and offsetting) after TF unit 112. To compensate for the pre- and post-processing, video postprocessor 31 may apply the inverse post-processing prior to inverse TF unit 126 performing inverse transfer function and inverse pre-processing after inverse TF unit 126 performs inverse transfer function. Applying both pre- and post-processing and inverse post- and inverse pre-processing are optional. In some examples, video preprocessor 19 may apply one, but not both of, pre- and post-processing, and for such examples, video postprocessor 31 may apply the inverse of the processing applied by video preprocessor 19.

The example video preprocessor 19 illustrated in FIG. 4 is described with the understanding that the example video postprocessor 31 illustrated in FIG. 5 performs the general reciprocal.

Figure 6:
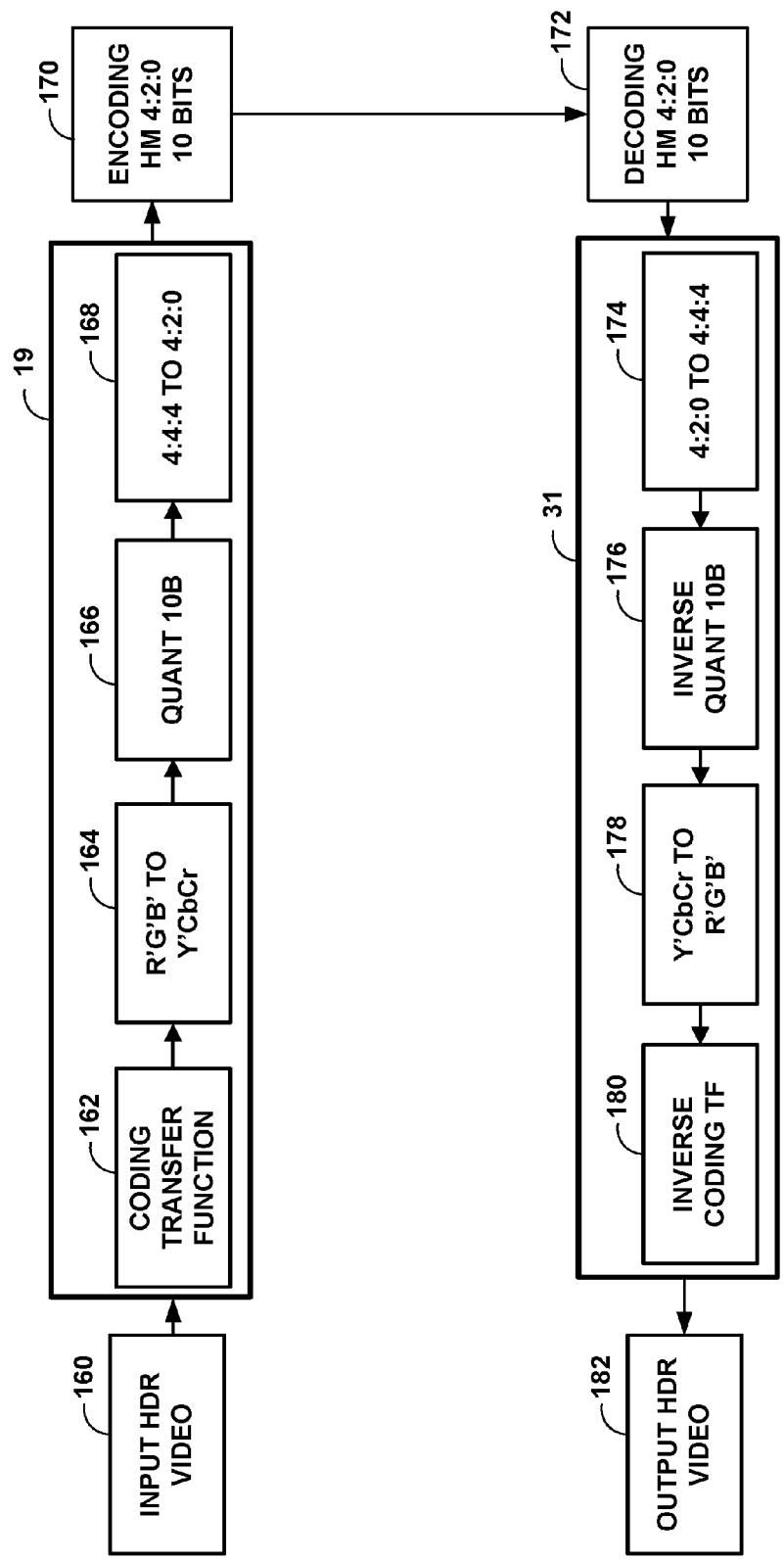
FIG. 6 is a conceptual diagram showing simplified encoding/decoding chains using RGB linear light.

FIG. 6 illustrates simplified encoding/decoding chains using RGB linear light. RGB linear light corresponds to RGB values relative to scene light and prior to applying a nonlinear transfer function such as OETF or inverse EOTF is applied. Input HDR video 160 may include RGB data in BT.709 or BT.2020. Input HDR video 160 may be prepro-cessed by e.g., preprocessor 19. Preprocessing includes performing coding transfer function 162, an R'G'B' to Y'CbCr conversion 164, quantization to 10-bit representation 166 and downsampling from 4:4:4 to 4:2:0 168. Output of preprocessor 19 may be encoded by encoder 20 (via e.g. the HEVC test model 4:2:0, 10 bits) at block 170. Decoder 30 may decode the output of encoder 20 at block 172 and feed the data to preprocessor 31. Preprocessing includes inversing the functions of the previous preprocessing. Preprocessing includes converting from 4:2:0 to 4:4:4 174, inverse quantization 176, convert Y'CbCr to R'B'G' 178, and performing an inverse coding transfer function 180. The output from preprocessor 31 is output HDR video 182. Output HDR video 182 may include RGB data in BT.709 or BT.2020.

A transfer function is applied to the data (e.g., HDR/WCG RGB video data) to compact its dynamic range and make it possible to represent the data with a limited number of bits. These limited number of bits that represent the data are referred to as codewords. This function is typically a one-dimensional (1D) non-linear function either reflecting inverse of electro-optical transfer function (EOTF) of the end-user display as specified for SDR in Rec.709 or approximating the HVS perception to brightness changes as for PQ TF specified in SMPTE-2084 for HDR. The inverse process (e.g., as performed by video postprocessor 31) of the OETF is the EOTF (electro-optical transfer function), which maps the code levels back to luminance. FIG. 7 shows several examples of non-linear TFs. These transfer functions may also be applied to each R, G and B channel separately.

RGB data is typically utilized as input, since it is produced by image capturing sensors. However, this color space has high redundancy among its channels and is not optimal for compact representation. To achieve more compact and more robust representation, RGB channels are typically converted to a more uncorrelated color space (i.e., a color transform is performed) that is more suitable for compression, e.g. YCbCr. This color space separates the brightness in the form of luminance and color information in different un-correlated channels.

For modern video coding systems, a typically used color space is YCbCr, as specified in ITU-R BT.709 or ITU-R BT.709. The YCbCr color space in the BT.709 standard specifies the following conversion process from R'G'B' to Y'CbCr (non-constant luminance representation):

$$Y' = 0.2126*R' + 0.7152*G' + 0.0722*B' \quad (1)$$

$$Cb = \frac{B' - Y'}{1.8556} \quad (3)$$

$$Cr = \frac{R' - Y'}{1.5748}$$

The above can also be implemented using the following approximate conversion that avoids the division for the Cb and Cr channels:

$$Y'=0.212600*R'+0.715200*G'+0.072200*B'$$

$$Cb=-0.114572*R'-0.385428*G'+0.500000*B'$$

$$Cr=0.500000*R'-0.454153*G'-0.045847*B' \quad (2)$$

Figure 8:
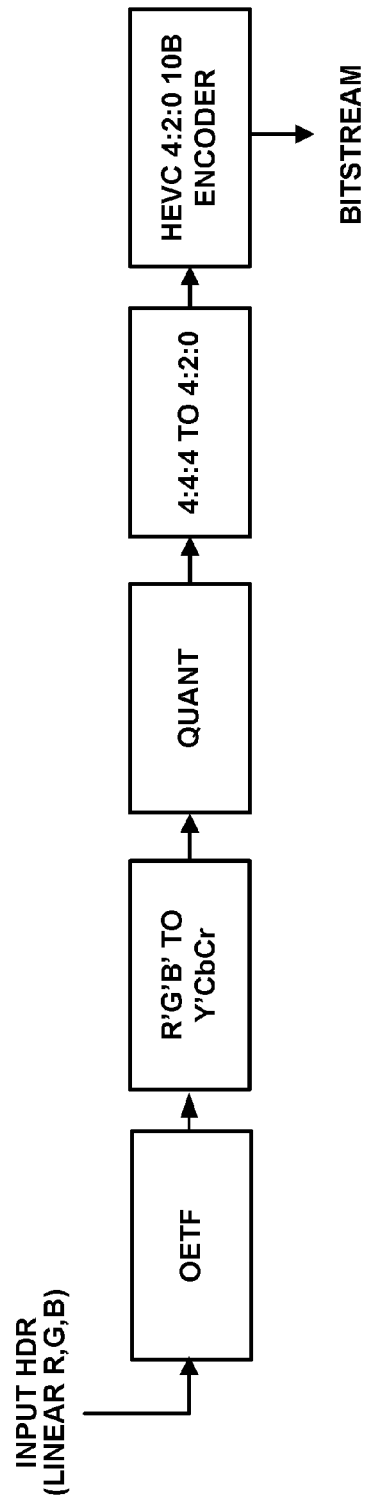
FIG. 8 is a conceptual diagram showing example NCL approach for HDR/WCG representation conversion.

The ITU-R BT.2020 standard specifies the following conversion process from R'G'B' to Y'CbCr: Constant-luminance (CL) and Non-constant luminance (NCL). FIG. 8 shows an example of the NCL approach which applies the conversion from R'G'B' to Y'CbCr after OETF. The conversion is done as below:

$$Y' = 0.2627*R' + 0.6780*G' + 0.0593*B' \quad (3)$$

$$Cb = \frac{B' - Y'}{1.8814}$$

$$Cr = \frac{R' - Y'}{1.4746}$$

Figure 9:
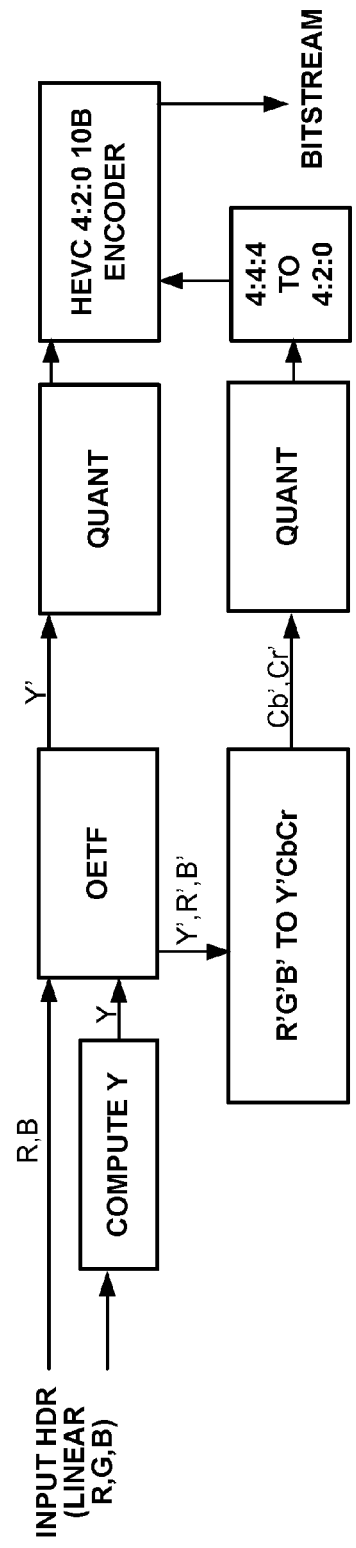
FIG. 9 is a conceptual diagram showing example CL approach for HDR/WCG representation conversion.

The CL approach generates Y'CbCr as illustrated in FIG. 9. To generate Y' (i.e., luma), luminance, Y, is first computed from R, G, and B in linear light then Y' is obtained by applying OETF to Y. Two chroma channels, Cb and Cr, are computed using Y', R', and B', where R' and B' are obtained by applying OETF to R and B. The details are described in the following equation.

$$Y' = TF(0.2627*R + 0.6780*G + 0.0593*B) \quad (4)$$

$$Cb' = \begin{cases} \frac{B' - Y'}{1.9404}, & -0.9702 \le B' - Y' < 0 \\ \frac{B' - Y'}{1.5816}, & 0 < B' - Y' \le 0.7908 \end{cases}$$

$$Cr' = \begin{cases} \frac{R' - Y'}{1.7184}, & -0.8592 \le R' - Y' < 0 \\ \frac{R - Y'}{0.9936}, & 0 < R' - Y' \le 0.4968 \end{cases}$$

It should be noted that Equations (3) and (4) are based on BT. 2020 color primaries and OETF specified in ITU-R BT.2020. Thus, if different OETF and/or color primaries are utilized, the denominators in those formula may be derived for the corresponding OETF and (or) color primaries. Also, both color spaces remain normalized, therefore, for the input values normalized in the range 0-1 the resulting values will be mapped to the range 0-1. Generally, color transforms implemented with floating point accuracy may provide perfect reconstruction, thus this process is lossless.

Following this, input data in a target color space, e.g. YCbCr color space, still represented at high bit-depth (e.g. floating point accuracy) is converted to a target bit-depth. Certain studies show that 10-12 bits accuracy in combination with the PQ TF is sufficient to provide HDR data of 16 f-stops with distortion below the Just-Noticeable Difference. HDR data at this bit depth can be further coded with most of the state-of-the-art video coding solutions. This quantization is an element of lossy coding and is a source of inaccuracy introduced to converted data.

Hybrid Log Gamma (HLG) OETF on input linear scene light in RGB color space may be used to produce an SDR approximation of the input HDR signal. However, such scene-referred representation is not common for HDR/WCG production process, since it does not guarantee quality of HDR/WCG representation. Instead, HDR/WCG signal is typically graded using a reference HDR monitor of certain characteristics such as peak brightness, average brightness, level of dark, certain color gamut etc. The output of the grading is called a display-referred signal which may reflect either linear light or which may have been coded using a certain EOTF. In order to handle display-referred signal in linear light form, the system includes an additional pre-processing step on the HDR signal, which is called "system gamma removal". The aim of this step is remove the display dependent grading inherent in the signal and to obtain the light values proportional to the scene light instead of displayed light so that the signal can be fed to the OETF. An example of this process, for signals which have been graded with usage of the gamma function can be implemented as follows: $R_d$, $G_d$, $B_d$ and $Y_d$ are the displayed referred signals which is input to this process and $R_s$, $G_s$, $B_s$ and $Y_s$ are the scene referred, display independent signals which is an output of this process.

Grading may be in the form of a gamma function:

$$Y_d = Y_s^\gamma \quad (5)$$

$$R_d = R_s \frac{Y_d}{Y_s} \quad (6)$$

$$G_d = G_s \frac{Y_d}{Y_s} \quad (7)$$

$$B_d = B_s \frac{Y_d}{Y_s} \quad (8)$$

The removal of the grading is defined as:

$$R_s = R_d Y_d^{\frac{1-\gamma}{\gamma}} \quad (9)$$

$$G_s = G_d Y_d^{\frac{1-\gamma}{\gamma}} \quad (10)$$

$$B_s = B_d Y_d^{\frac{1-\gamma}{\gamma}} \quad (11)$$

Figure 10:
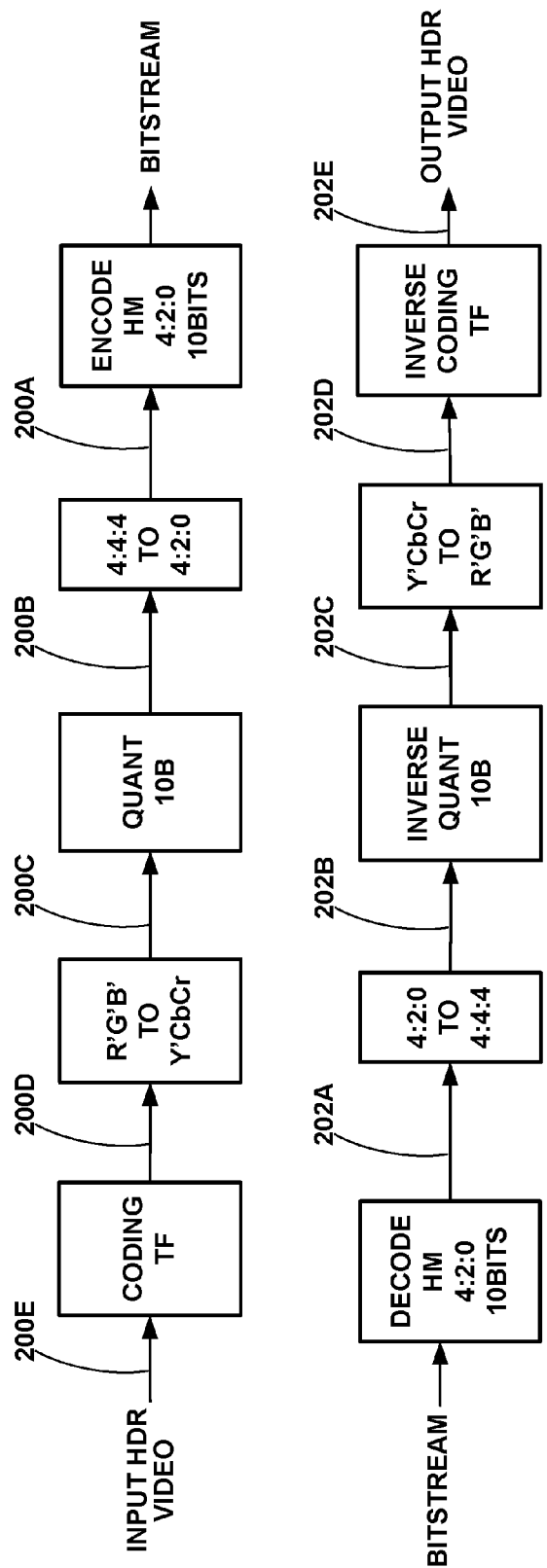
FIG. 10 is a conceptual diagram of a reference system according to techniques of the present disclosure.

FIG. 10 illustrates a reference system utilizing HEVC codec with Main10 profile. The coding function between the points in 200E and 200D in the system shown in FIG. 10, is the inverse Electrical to Optical Transfer Function (EOTF) and the one between the 202D and 202E is the EOTF.

The post-processing operations defined within a single layer anchor have a commonality with a system deploying an existing HEVC Main 10 profile at point 202A meaning that the signal at point 202A can be consumed by the existing legacy displays. However, when the signal passes through the post-processing chain of such system, the image displayed can lose the intended look. In general, the colors may look washed out and the artistic intent present in the HDR signal may not be preserved anymore.

In specific applications such as broadcast environments, it may be desirable to have an HDR and WCG coding and transmission system that would provide viewable image to the exiting (e.g., legacy) receivers who do not have the post-processing chain implemented. One exemplary solution having such a capability is to design a system that would have two inputs graded for both SDR and HDR/WCG. These two inputs can be coded either jointly or independently and would be transmitted on the same channel or separate channels so that and HDR and WCG capable receivers will be able to extract the HDR and WCG graded video signal and the existing receivers will extract an SDR video. One particular example of this principle was used as the reference point in category 2 of "Call for Evidence (CfE) for HDR and WCG Video Coding", MPEG document M36131, Switzerland, February 2015 (referred to as the MPEG Reference Point). However, an issue with such solutions is the additional bitrate overhead. The increase in bitrate may go up to twice the bitrate of SDR or more in the case of independent coding of the signals using a single layer codec such as HEVC or a layered codec without any inter-layer prediction. On the other hand, the bitrate increased could be around 15 to 20% in the case of a layered codec utilizing inter-layer prediction between SDR and HDR and WCG layers at the cost of increased complexity of encoding.

Another example a single layer system where the pre-processing creates a video signal that has a certain quality such that when decoded and viewed by existing receivers, an acceptable user experience is satisfied. On the other hand, an HDR signal is recovered by applying certain predefined operations on the signal. Hence the luminance levels in the signal are proportional with the light seen on the reference display. The pre-processing operations create the tone-mapping such that the resulting 10-bit integer video is a "viewable SDR video". However, one such example works with scene light in which the luminance levels are proportional with the light in the scene. This example may define an Optical to Electrical Transfer Function (OETF), also referred to as Hybrid-Log Gamma (HLG), to map the scene light to nonlinear code values to output a scene-referred signal and the SDR backwards compatibility is achieved by the design of the OETF which is similar to the OETF defined in Rec.709 for the luminance levels up to a certain value. In order to reconstruct the HDR signal from the scene referred signal, the OETF may be inverted and a gamma based Optical to Optical Transfer Function (OOTF) is applied to adapt the scene light to the display capabilities and ambient viewing conditions. It is possible to obtain only an approximation of the scene light from the display referred signal since the grading is generally performed manually and with an artistic intent. Grading may be a user controlled manual process thus the removal operation is most likely an approximation which causes loss.

A problem of some of the foregoing examples which are capable of providing backwards compatibility in a single bitstream for display referred content is complexity introduced compared to the anchor approach and the level of changes introduced to the system design. Pre and post operations defined in these systems may require nonlinear operations with cross color dependency.

One of the problems associated with exemplary systems is related to the input format "scene-light" required by the system. Non-broadcast type content are typically graded using reference monitors, thus they are display-referred. In order to work with display-referred signal, a grading removal may be a necessary pre-processing step. The removal of the grading may be an approximation as it assumes the grading is done according to the formulae (1)-(4) (defined above). Hence, the output of the grading removal step may be an approximation to the actual scene light since the grading generally includes manual tuning by an artist.

Another problem is to avoid grading of the content at the pre-processing stage and signal the scene-referred signal to the receiver which is obtained directly from the scene-light. Hence the grading of the signal may be moved to the post-processing stage and it is a function of several samples values (R,G,B,Y) all of which may include distortions from compression. Hence the grading may have several sources of distortion when it is conducted at the post-processing.

Another problem is the theoretical maximum luminance value (of the scene) that can be coded with the system. This value may be around 4000 nits for a 10 bit signal and natural content which is much less than what is achievable with ST 2084 that is 10000 nits.

Techniques of the present disclosure include a HDR/WCG video coding architecture which is capable of providing both an SDR compatible signal and an HDR/WCG signal from a single bitstream through the usage of Dynamic Range Adjustment (DRA). A coding system design may include a static, non-SDR compatible coding transfer function such as the inverse of EOTF defined in ST.2084, and a set of DRA that are applied to color channels of the signal, e.g. R, G, B or Y, Cb, Cr, to provide SDR-compatible bitstream and be still able to reconstruct input HDR/WCG signal from this bitstream by applying inverse DRA at the decoder side.

In one example, an encoder/decoder may apply the suggested DRA in Y,Cb,Cr domain for each color channels independently or it can be applied in both, Y,Cb,Cr domain as well as R,G,B domain. Channels-independent DRA can be accompanied with a color correction operation, which will be applied on CbCr color channels or on RGB channels.

In one example, an encoder/decoder may apply a reference SDR tone mapper that can be used to derive the parameters of forward DRA model which provide an SDR-compatible bitstream and the parameters of an inverse DRA model which may be signaled over the bitstream and control HDR reconstruction process at the receiver side. In another example, parameters of the DRA model that may be required for HDR reconstruction from compressed SDR-compatible bitstream can be provided to a decoder as a side information, and thus signaling can be avoided.

In one example, the HDR reconstruction process at the decoder side may output HDR signal with a transfer function which is different from the source transfer function and reference model which is utilized for SDR tone mapping.

In some examples, an encoder/decoder may identify the produced SDR-compatible bitstream with an id of transfer function, which is signaled as syntax element in coded bitstreams, e.g. as VUI. In a further example, the DRA parameters may be incorporated in SDR-compatible bitstream and controlling the HDR reconstruction process include a syntax element which identifies a target EOTF to be used to interpret HDR output after reconstruction. A target EOTF may not match an OETF or inverse EOTF utilized at a source signal.

In another example, in the case of bitstream incorporating several SEI entities which have different transfer characteristics id, HDR reconstruction may treat decoded SEI exclusively, selecting the SEI with required transfer characteristics id, and ignore control information present in other SEI.

In some examples, a single bitstream may incorporate several entities of DRA control information which would allow HDR reconstruction to a different target EOTF.

Figure 11:
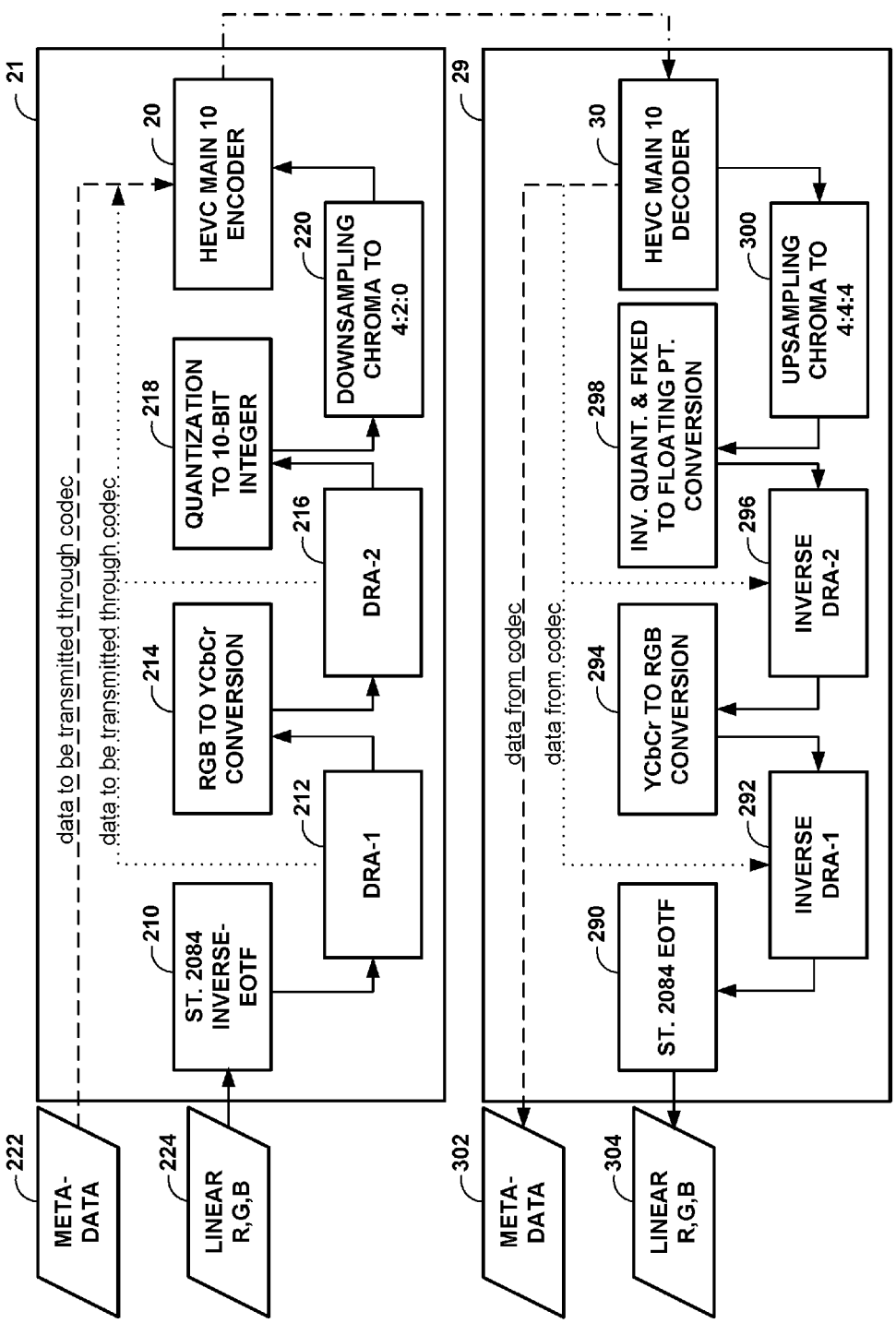
FIG. 11 illustrates a block diagram of the techniques of the present disclosure.

FIG. 11 illustrates a block diagram of the techniques of the present disclosure. FIG. 11 illustrates an HDR/WCG pre-processor/encoder (e.g., video encoding unit 21) and pre-processor/decoder (e.g., video decoding unit 29) with SDR backwards compatibility. Video encoding unit 21 may include inverse-EOTF unit 112, dynamic range adjustment unit (DRA-1) 212, RGB to YCbCr converter 214, second dynamic range adjustment unit (DRA-2) 216, quantization unit 218, downsampler 220, and encoder 20. Inverse-EOTF unit 112 may be a ST. 2084 inverse-EOTF unit or may use the BT. 2100 standard. Quantization unit 218 may perform quantization to a 10-bit integer. Encoder 20 may include an HEVC main 10 encoder. Video encoding unit 21 may accept metadata 222 and linear RGB video 224 as input. Metadata 222 may include information about the mastering display such as peak brightness, color gamut/volume. Metadata 222 may also include information about the statistics of the content such as maximum/minimum absolute brightness, relative signal values for a frame or for certain durations of the content. Metadata 222 may also include information about the reference and/or target viewing environment such as background light level and/or reflectivity. Metadata 222 may also include remapping information to be applied on the decoded samples for adapting the content to different purposes.

Linear RGB video 224 may include HDR and/or WCG video. Downsampler 220 may downsample the chroma channel to 4:2:0 from 4:4:4.

DRA-1 212 and DRA-2 216 may comprise piece-wise linear functions applied on color channels and may comprise transform functions from HDR to SDR and/or WCG to SCG. DRA-1 212 to be applied on R, G, B values separately (one-set of parameters that are same for R,G,B) and DRA-2 216 to be applied on Cb, Cr. DRA-1 212, being applied in the R, G, B domain may provide a close approximation of the reference SDR tone mapper and thus achieve high quality SDR approximation. The DRA-2 216 being applied on Cb, Cr channels provide color volume correction for Cb and Cr chromaticity.

In an example, DRA-1 212 is applied on R,G,B samples but targets a tone-mapping operation for luminance, i.e., the dynamic range of the signal is reduced to SDR levels of dynamic range. As a result of this operation, one reference model used for tone-mapping may result in a hue shift in chroma channels after RGB to YCbCr conversion is completed. The reason for this may be due to the order of transfer function and color conversion operations. When tone-mapping is applied on a true luminance channel, there may not be any hue shift. But existing video systems may already apply a transfer function on R, G, B samples. Therefore, after the color space conversion, a second DRA (e.g., DRA-2 216) may be applied on Cb and Cr channels to correct the hue shift. In another example, the operation of both DRA-1 212 and DRA-2 216 may be approximated by applying separate DRAs on Y and Cb/Cr channels and may avoid separate DRA operations in different parts of the chain (as shown in FIG. 11 as compared with, e.g., the system of FIGS. 12 and 13).

In some examples, parameters of utilized DRA-1 212 and/or DRA-2 216 may be static and provided to the receiver as a side information without signaling it through the bitstream. In other examples, parameters of DRA-1 212 and/or DRA-2 216 can be adaptive to the scene changes and can be signaled through the bitstream.

FIG. 11 illustrates an exemplary solution that provides SDR backwards compatibility when the input signal is display referred. The system of FIG. 11 may also represent a solution for any tone-mapper that operates on either a display-referred signal or scene-light.

Video decoding unit 29 maybe configured to accept as input the bitstream output from encoder 20 and perform the inverse. Video decoding unit 29 may include decoder 30 (configured to perform the inverse of encoder 20), upsampler 300 (configured to perform the inverse of downsampler 220), inverse quantization unit 298 (configured to perform the inverse of quantization unit 218), inverse DRA-2 unit 296 (configured to perform the inverse of DRA-2 216), YCbCr to RGB converter 294 (configured to perform the inverse of RGB to YCbCr converter 214), inverse DRA-1 unit 292 (configured to perform the inverse of DRA-1 212), and EOTF unit 290 (configured to perform the inverse inverse-EOTF unit 210). Inverse quantization unit 298 may be further configured to perform fixed to floating point conversion. Metadata 302 may be similar to metadata 222 and may comprise standard information and max brightness information. Linear RGB video 302 may include HDR and/or WCG video and may be similar to linear RGB video 224.

In some examples, a selected SDR tone mapping system can be used as a reference for the derivation of DRA parameters. An exemplary SDR tone mapping system is described in A. Cotton, T. Borer, M. Pindoria, S. Thompson, M. Naccari, S. Schwarz, M. Mrak, m36249-BBC's response to CfE for HDR Video Coding (Category 3a), MPEG meeting in Warsaw, June 2015 (referred to as the MPEG Tone Map). This exemplary tone mapping system is included in ITU-R specification BT.2100 as HLG. The HLG transfer function is an HDR transfer function that is backwards compatible to to SDR transfer functions (such as, e.g., BT.709). ITU-R specification BT.2100 also defines an HDR transfer function, inverse Perceptual Quantization (PQ). A PQ HDR signal without further processing may not produce a suitable image on an SDR display. According to techniques of the present disclosure, an HLF OETF combined with a PQ to HLG conversion operation may be used as a reference tone-mapper for a PQ system. Such a system may be used as a reference tone mapper to derive parameters for DRA-1 212 and DRA-2 216.

Figure 12:
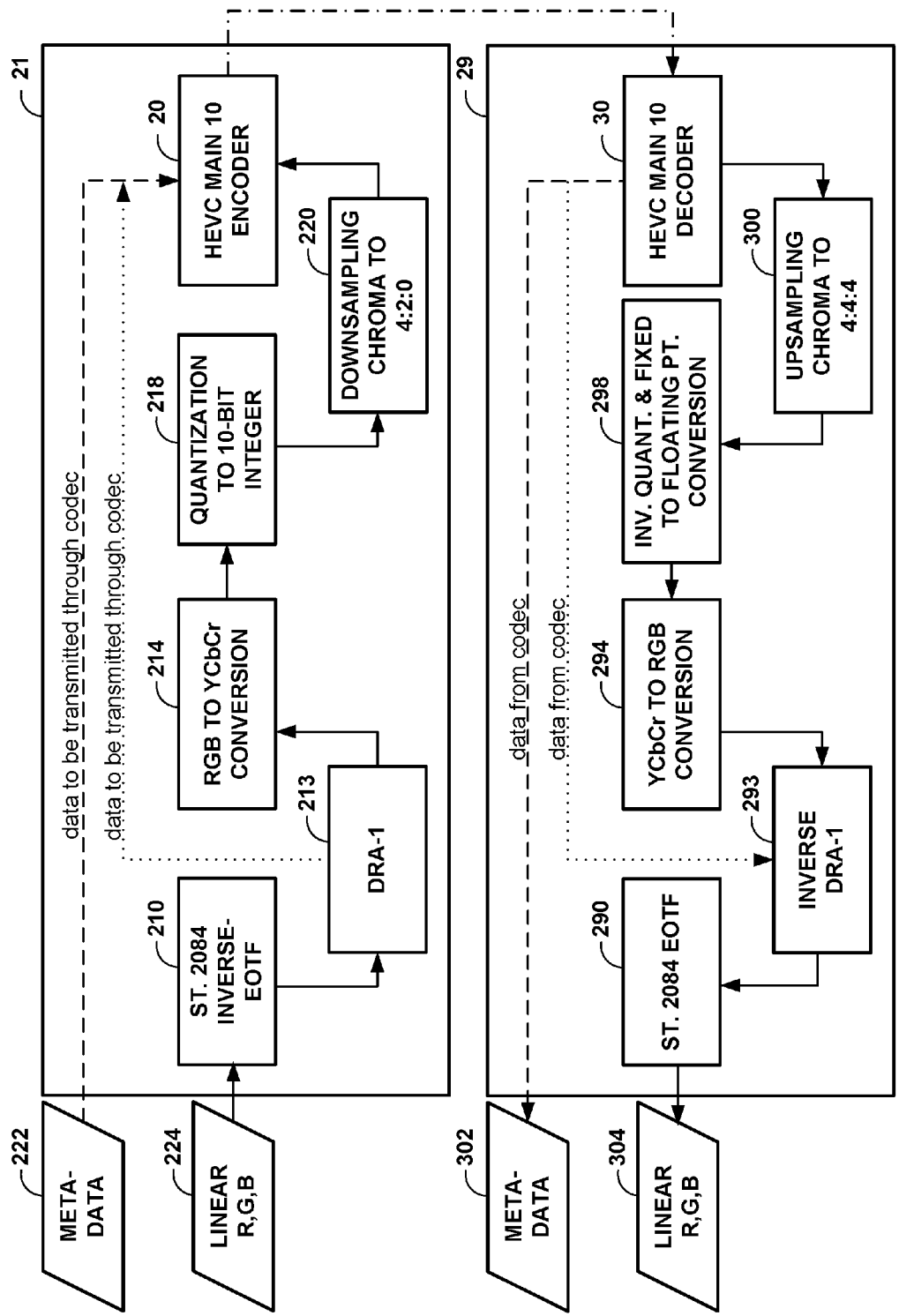
FIG. 12 illustrates another block diagram of the techniques of the present disclosure.

FIG. 12 illustrates a block diagram of the techniques of the present disclosure. The system of FIG. 12 may be similar to the system of FIG. 11 except a single dynamic range adjustment unit DRA-1 213 and inverse DRA-1 2932 is used. FIG. 12 with DRA-1 213 may applied on Y,Cb,Cr separately (each channel has its own set of parameters, where the number of ranges, their scale, offset and required frequency of signaling may vary between the channels). An advantage of such system design, is that ATF operations will be limited to YCbCr domain and the HDR reconstructed signal can be directly output in YCbCr 4:2:0 representation. Thus a signal conversion to YCbCr 4:4:4, RGB representation and floating point operations are avoided, if linear RGB are not expected to be delivered by the system.

In some examples, parameters of utilized DRA-1 213 can be static and provided to the receiver as a side information without signaling it through the bitstream. In other examples, parameters of DRA-1 213 can be adaptive to the scene changes and can be signaled through the bitstream.

The system of FIG. 12 is an example solution for any tone-mapper which may operate either on scene-light or display referred signal. In this system, the main difference is the color space (domain) in which the DRA is applied. FIG. 12 is an example solution where the coding transfer function reshaping is performed on Y, Cb, Cr separately.

Figure 13:
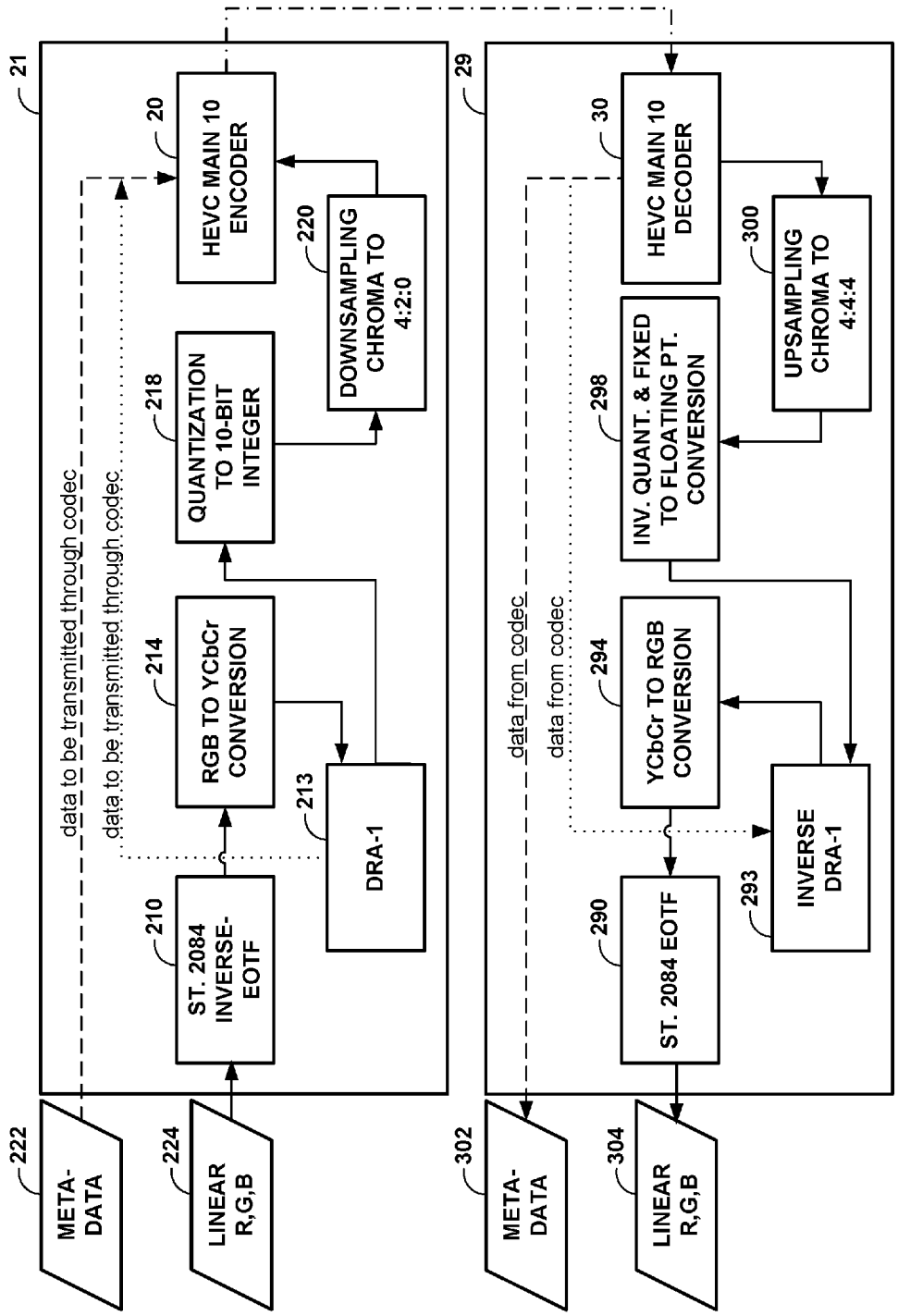
FIG. 13 illustrates another block diagram of the techniques of the present disclosure.

FIG. 13 illustrates a block diagram of the techniques of the present disclosure. The system of FIG. 13 may be similar to the system of FIG. 12 except the dynamic range adjustment performed by DRA-1 213 is performed on YCbCr data following the RGB to YCbCr conversion of RGB to YCbCr converter 214 and, similarly, inverse DRA-1 293 is performed on YCbCr data following inverse quantization (on inverse quantization unit 298) and prior to performing the YCbCr to RGB conversion (via RGB to YCbCr converter 214). In FIG. 13, DRA-1 213 may be applied on R,G,B channels separately (each channel has its own set of parameters, where the number of ranges, scale and offsets as well as required frequency of signaling may vary between the channels). In some examples, parameters of utilized DRA can be static and provided to the receiver as a side information without signaling it through the bitstream. In other examples, parameters of DRA can be adaptive to the scene changes and can be signaled through the bitstream. In another example, DRA-1 213 may be applied to R,G,B channels where each channel shares a common parameter set.

The system of FIG. 13 is an example solution that provides SDR backwards compatibility when the input signal is proportional to scene-light (when using e.g., the MPEG Tone Map as a reference tone mapper). Any other tone mapper operating on either scene-light or display referred signal may be used as the reference model for the DRA within this example.

DRA-1 212 and DRA-2 216 and their inverse functions) of FIG. 11 and DRA-1 213 (and its inverse) of FIGS. 12 and 13 conduct dynamic range adjustment to an input signal which includes the full dynamic range of the input signal or for a fraction of the range by applying a piece-wise linear mapping between the input and output. Being combined with a static non-linear coding transfer function inverse-EOTF or OETF at the encoder side, such as inverse EOTF 210 in ST.2084, and an EOTF 290 at the decoder side, the DRA may adapt transfer functionality of the system to parameters of the signal and needs of targeted application. Such combination of static TF and DRA is called Adaptive Transfer Functionality (ATF).

DRA implementation operates over the full dynamic range of the input signal channels of YCbCr and/or RGB or over set of fractions of the dynamic range of the input signal. Certain examples of DRA may apply partitioning of the full dynamic range in certain number of partitions and process samples belonging to each partitioning independently. DRA applies to each processed sample a basic scaling operation:

$$Y = x * \text{Scale} + \text{Offset} \quad (12)$$

In one example, Scale and Offset values employed by DRA, may be fixed for an entire dynamic range of signal x, or fixed for a sub-partition of the dynamic range to which value x belongs to, if such partitioning is utilized. In another example approach, is that the same operations can be implemented as 1D Look-Up Table (LUT).

Inverse DRA may be applied (by e.g., inverse DRA-1 292, inverse DRA-1 293, and inverse DRA-2 296) to each sample of target color channel independently and it can be applied on Y,Cb,Cr data and/or on RGB samples, depending on the utilized configuration. Inverse DRA at the decoder side (e.g., video decoding unit 29) is controlled by following parameters which can be signaled over bitstream: (1) applicable dynamic ranges (partitions size) of input signal to be processed, (2) scale value for each of the range (partition), and (3) a global offset value. This DRA control information may be automatically estimated at the HDR/WCG encoder side (e.g., video encoding unit 21) and can be signaled to the HDR/WCG in the form of a dedicated SEI message or in form of other normative syntax element of HEVC or other its extensions. Exemplary syntax elements and semantics for this control information are described below.

Figures 14A, 14B:
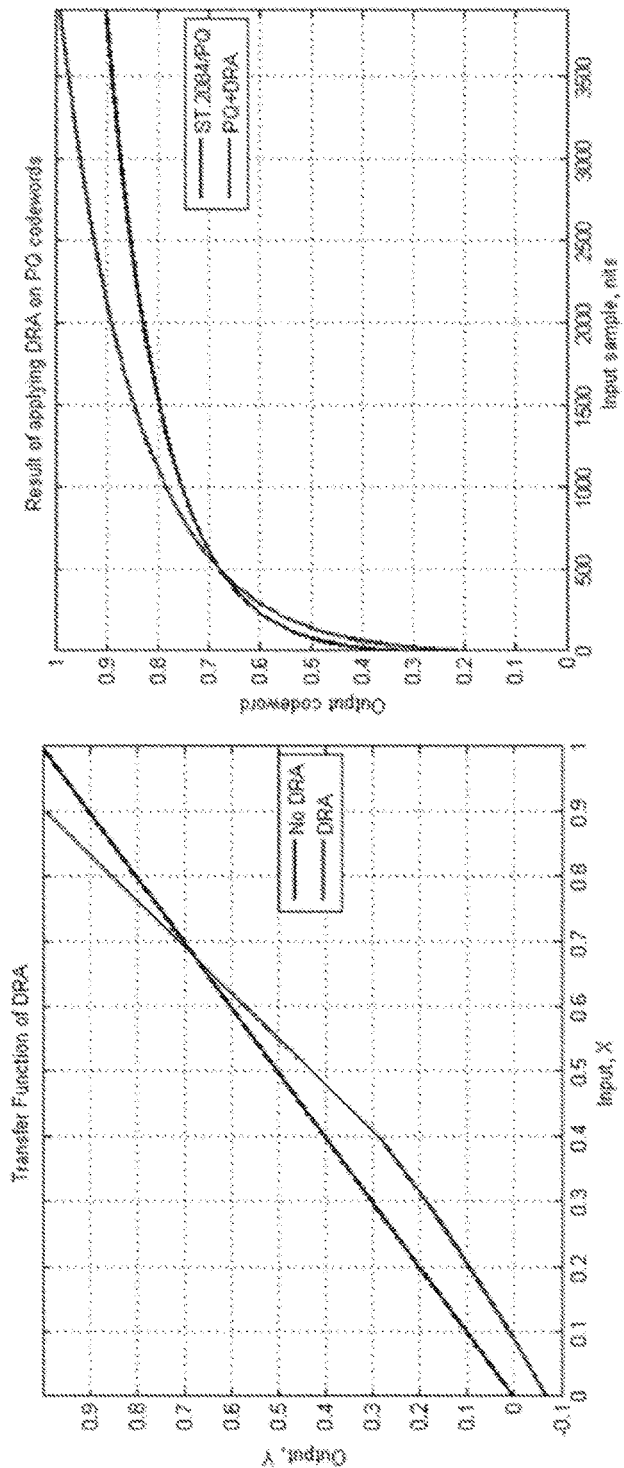
FIGS. 14A and 14B illustrate an example of utilization of DRA for implementing ATF functionality according to techniques of the present disclosure.

FIGS. 14A and 14B illustrate an example of utilization of DRA for implementing ATF functionality according to techniques of the present disclosure. FIG. 14A illustrates a transfer function specified by DRA and FIG. 14B illustrates an aggregate coding function. FIGS. 14A and 14B illustrate DRA employing 3 dynamic range partitions applied on RGB samples (e.g., DRA-1 212 of FIG. 11) and effectively modulating a static coding function (e.g., the inverse EOTF 210 in ST.2084 of FIG. 11) to achieve more efficient for compression data representation.

Figure 15B:
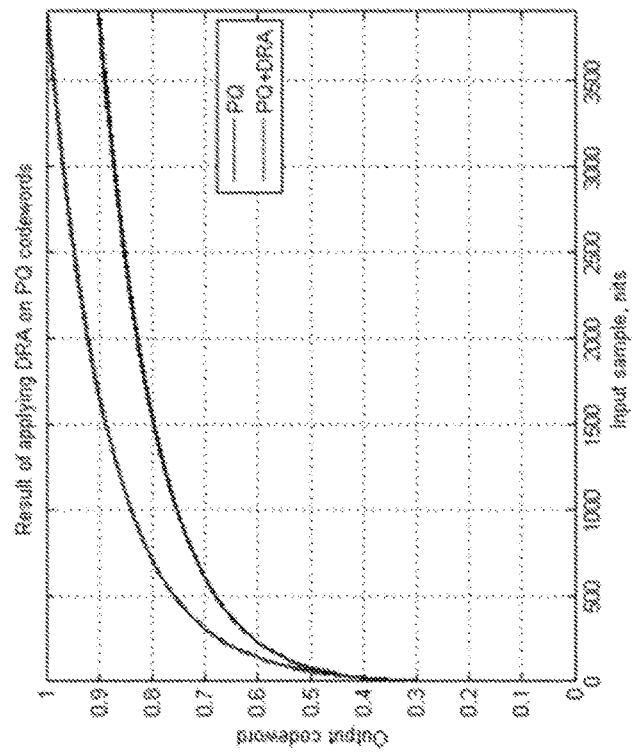
FIGS. 15A and 15B illustrate an example of HDR/WCG representation conversion according to techniques of the present disclosure.
Figure 15A:
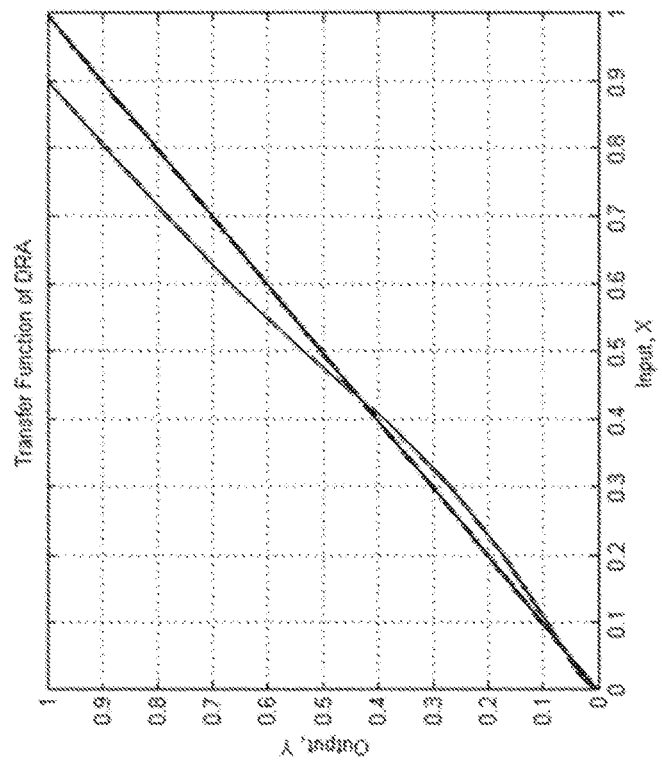

FIGS. 15A and 15B illustrate another an example of utilization of DRA for implementing ATF functionality according to techniques of the present disclosure. FIG. 15A illustrates a transfer function specified by DRA and FIG. 15B illustrates an aggregative coding function. FIGS. 15A and B illustrate an example of HDR/WCG representation conversion, where DRA employing 20 partitions is applied on R'G'B' samples (DRA-1 212 in FIG. 11) and effectively modulate resulting coding function to achieve SDR backward compatibility.

An example of ATF utilization is discussed in D. Rusanovskyy et. al., Single layer non-normative (category 3a) NCL and CL responses to the Call for Evidence on HDR/WCG MPEG document m36256, Warsaw, Poland, June 2015. This example defines another use-case for DRA utilization and describe system architecture that is capable of providing SDR backwards compatibility feature to the system shown in FIG. 10. FIG. 10 illustrates an end to end coding and decoding chain. One example includes DRA blocks at points 200D and 22C and inverse DRAs at 202C and 202D. Another example includes a single DRA at point 200C and inverse DRA at 202C.

An exact ATF model with parameters defining the number of DRAs that may be used, and the position of the dynamic range adjustment in the processing chain (the domain of applicability, e.g. R,G,B or Y,Cb,Cr), the channels of the signal on which DRA is applied, the parameters of the DRA (regions, scales, offsets etc.) may depend on other system parameters, such as reference SDR tone mapper, HDR transfer function of the source and target HDR transfer function at the output of HDR reconstruction process.

This example also includes three embodiments of system designs utilizing DRAs to obtain an SDR backwards compatible output from the input HDR signal at the pre-processing. The output of such pre-processor can be directly displayed at SDR displays, e.g. utilizing the EOTF defined in ITU-R BT.1886. To reconstruct HDR/WCG signal from this SDR-compatible representation, an inverse tone mapping process implemented with DRA may be utilized at the post-processing stage. In some embodiments, the encoder (e.g., encoder 20) may signal the parameters of the inverse-DRAs (e.g., inverse DRA-1 292, inverse DRA-1 293, or inverse DRA-2 296) to the receiver/decoder (e.g., video decoding unit 29) through an SEI message that can be utilized with either HEVC or AVC or through syntax elements of Sequence Parameter Set (SPS), Picture Parameters Set and/or their extensions for video coding systems with normative reconstruction process.

Tone mapping may be applied on an image with a specific set of colors that has relatively high dynamic range in order to approximate the appearance of high-dynamic-range image in a medium that has a more limited dynamic range. There are two classes of tone-mappers: global tone mapping operators that operate on frame level and local tone-mappers. Algorithms for tone mapping include simple gamma operation to more sophisticated statistical/iterative algorithms.

Derivation of DRA parameters for the creation of an SDR compatible signal is a pre-processing algorithm and it can cover a variety of different algorithms with varying computational and implementation complexity as well as SDR and HDR signal quality. The selection of the reference tone mapper or tone mapping algorithm as well as the implementation domain of the DRAs determine the exact implementation of the derivation process. However, a general framework can be summarized as: (1) signal at the output of the reference tone mapping process (e.g., a tone mapping operation that will provide another version of the HDR image with a reduced dynamic range) is obtained (either in R,G,B or Y,Cb,Cr domain), (2) a signal at point 200D, 200C, 200B or even 200A of FIG. 10 is obtained, and (3) an optimization problem is defined that tries to minimize the mean square error between the signal at (1) and a piece-wise linear mapping of the signal at (2) where the number of ranges and the partitioning of the whole dynamic range are the search parameters in the optimization. The output of the optimization process in item (3) provides the parameters of the DRA. The optimization problem defined in item (3) can be constrained by some guidance on the defined search. The histogram of a color channel may be approximated by applying a piece-wise linear mapping from one histogram to another, minimizing the difference between the two histograms. Since the mapping error depends on both the selection of ranges and the precision of the parameter within each range, any system level decision on error limits or parameter precision or desired number of ranges or any preference on certain parts of the dynamic range being more important may provide guidance on the search.

In case of a specific implementation (e.g., where the MPEG Tone Map is used as the reference tone-mapper for SDR), the derivation of the parameters for the DRA-1 (e.g., DRA-1 212 and DRA-1 213) is performed according to the above optimization problem where a solution containing 20 sub-ranges that are unequally divided throughout the full range of the signal provides a good approximation of the reference with a visually imperceptible error level. In this specific example, the reshaping of the signal range is static and is derived only once for reference.

The removal of the grading defined in the MPEG Tone Map is an approximation. In another example implementation, a different approximation of the removal of grading which removes the cross-color dependency on the mapping of a certain channel value, by defining it:

$$R_s = R_d^{\frac{1}{\gamma}} \quad (13)$$

$$G_s = G_d^{\frac{1}{\gamma}} \quad (14)$$

$$B_s = B_d^{\frac{1}{\gamma}} \quad (15)$$

In order to keep the hue and saturation of the signal unchanged, the mapping of the dynamic range (either the removal of grading or the DRA-1) may be applied on the true luminance signal. In HDR content production workflow, the artist generally creates a luminance map for a certain scene by viewing the content on the reference display, thus the mapping may not cause any shift on the colors of the scene. However, the system defined in the MPEG Reference Point that specifies "Coding TF" on each R, G, B channel separately. In order to utilize mapping on luminance channel, color space transformations from RGB to XYZ and back to RGB (and other intermediate transforms) may be added to the system. In order to keep the independent processing of the three channel information, i.e. R, G, B, and to avoid additional color transformations, DRA-1 may be applied on the R,G,B samples and to approximate the shift on the hue and saturation caused by this selection with a second DRA applied on the Cb and Cr samples at point 200C of FIG. 10.

In some examples, encoder 20 (and video encoding unit 21) may model the DRA to a single scale value for each color channel:

$$C'_b = \alpha C_b \quad (16)$$

$$C'_r = \beta C_r \quad (17)$$

In such examples, $\alpha$ and $\beta$ may be derived with respect to the reference tone-mapped signal and tone-mapping algorithm.

In other embodiments, DRA-2 (e.g., DRA-2 216 of FIG. 11) can be as generic as DRA-1 (e.g., DRA-1 212 of FIG. 11) which means DRA-2 may be modeled as a piece-wise linear mapping that includes several sub-ranges either evenly or unevenly distributed throughout the whole range.

It has been observed that $\alpha$ and $\beta$ values may vary depending on the dynamic changes in the scene brightness and hence can be signaled on changes. A temporal consistency can be achieved if the scale values are determined over a number of frames, for example, it can be aligned with frame rate or intra coded frame frequency. The final value can be obtained from the mean or median of each frame based value.

Figure 16:
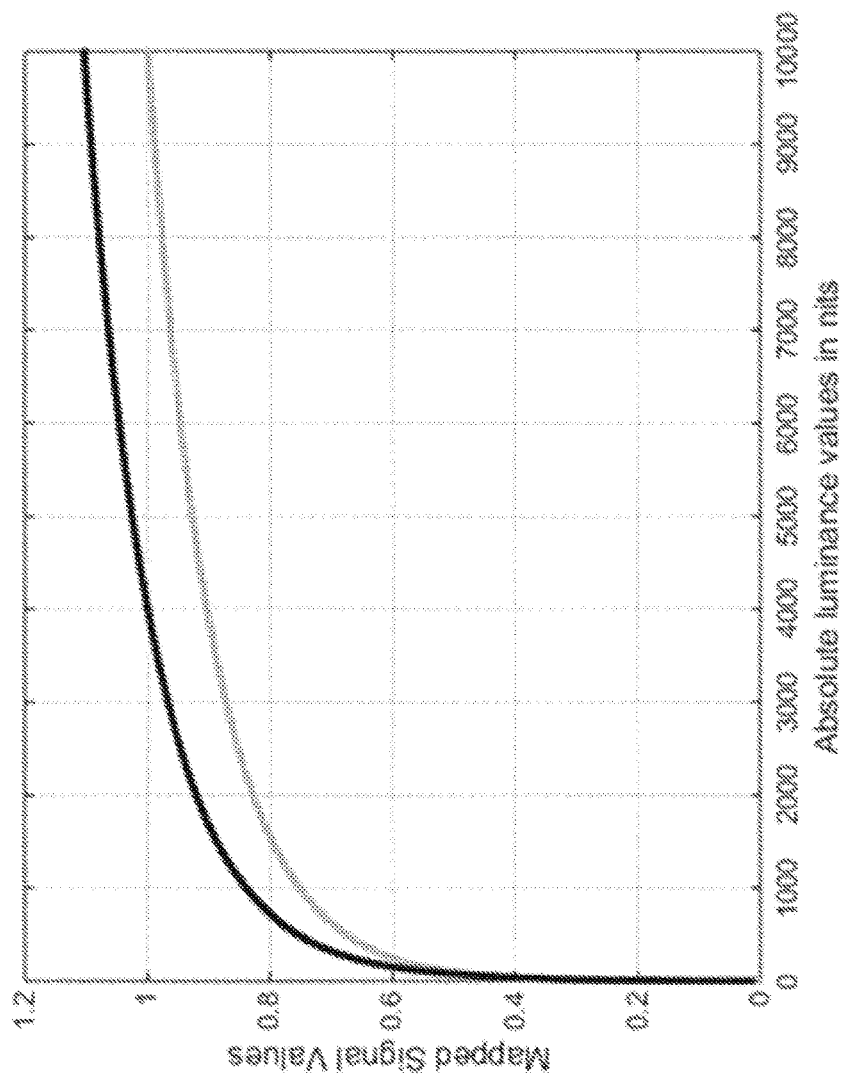
FIG. 16 illustrates the comparison of the signal at the input and output of a DRA unit according to techniques of the present disclosure.

FIG. 16 shows the comparison of the signal at the input and output of DRA-1 block (e.g., DRA-1 212 of FIG. 11) according to techniques of the present disclosure. DRA-1 applies a piece-wise linear reshaping on the signal so that the effective coding transfer function characteristics changes. Please note that this is equivalent to replacing the coding TF, however the usage of DRA allows to reshape the signal without significant system level changes. Replacing the TF would require the receiver side to support a new TF each time a different reshaping is desired to be used. However, supporting a DRA block is sufficient for the system to be able to support different reshaping functions, which is realized using the DRA parameters received.

Example implementation of DRA-1 for the mapping shown in FIG. 14 includes 20 ranges divided unevenly on the signal range. For each region, one set of scale and offset parameters define the linear mapping in that region.

Figure 17A:
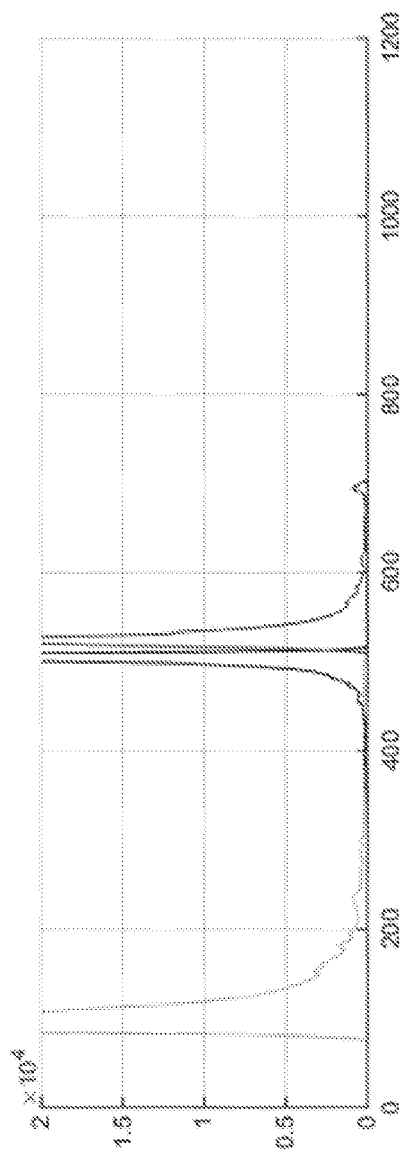
FIGS. 17A and 17B illustrate a signal histogram according to techniques of the present disclosure.
Figure 17B:
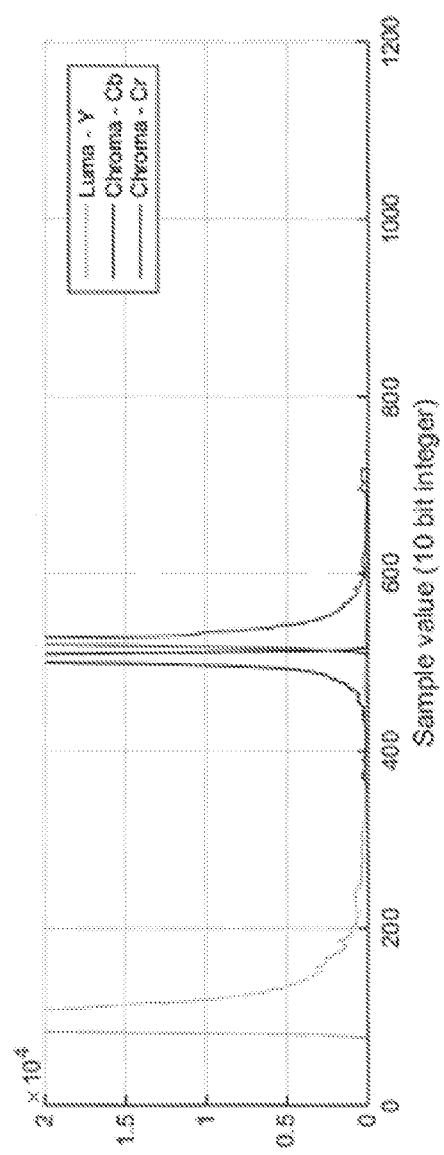

FIGS. 17A and 17B illustrate a signal histogram at point 200A in FIG. 10 obtained by the MPEG Reference Point (FIG. 17A) and the exemplary method (FIG. 17B).

For the signaling of the parameters of DRA, encoder 20 may use an SEI message. An example of syntax and semantics of such an SEI message that would provide signaling for the methods described in this invention is provided below.

TABLE 2

General SEI message syntax

| | Descriptor |
|---|---|
| sei_payload( payloadType, payloadSize ) { | |
|   if( nal_unit_type = = PREFIX_SEI_NUT ) | |
|   ... | |
|   else if( payloadType = = XXX ) | |
|     hdr_reconstruction_info( payloadSize ) | |
|   ... | |
| } | |

TABLE 3

HDR reconstruction information SEI message syntax

| | Descriptor |
|---|---|
| hdr_reconstruction_info( payloadSize ) { | |
|   hdr_recon_id | ue(v) |
|   hdr_recon_cancel_flag | u(1) |
|   if( !hdr_recon_cancel_flag ) { | |
|     hdr_recon_persistence_flag | u(1) |

TABLE 3-continued

HDR reconstruction information SEI message syntax

| | Descriptor |
|---|---|
| hdr_recon_transfer_characteristics | u(8) |
| hdr_recon_default_flag | u(1) |
| if( !hdr_recon_default_flag ) { | |
|     hdr_recon_scale_bit_depth | u(4) |
|     hdr_recon_offset_bit_depth | u(4) |
|     hdr_recon_scale_frac_bit_depth | u(4) |
|     hdr_recon_offset_frac_bit_depth | u(4) |
|     hdr_recon_num_comps_minus1 | ue(v) |
|     hdr_negative_scales_present_flag | u(1) |
| } | |
| for( c = 0; c <= hdr_recon_num_comps_minus1; c++ ) | |
| { | |
|     hdr_recon_num_ranges[ c ] | ue(v) |
|     hdr_recon_equal_ranges_flag[ c ] | u(1) |
|     hdr_recon_global_offset_val[ c ] | u(v) |
|     for( i = 0; i <= hdr_recon_num_ranges[ c ]; i++ ) | |
|         hdr_recon_scale_val[ c ][ i ] | u(v) |
|     if( !hdr_recon_equal_ranges[ c ] ) | |
|         for( i = 0; i <= hdr_recon_num_ranges[ c ]; i++ ) | |
|             hdr_recon_range_val [ c ][ i ] | u(v) |
| } | |

Table 3 defines newly-added syntax elements according to the following parameters semantics):

hdr_recon_id contains an identifying number that may be used to identify the purpose of the HDR reconstruction information. The value of hdr_recon_id shall be in the range of 0 to 232−2, inclusive. Values greater than 2 are reserved for future use by ITU-T|ISO/IEC and shall not be present in bitstreams conforming to this version of this Specification. Decoders shall ignore all HDR reconstruction information SEI messages that contain a value of hdr_recon_id greater than 2, and bitstreams shall not contain such values.

hdr_recon_id equal to 0 specifies that the mapping applies in the YCbCr domain, and that the mapping of each color sample is achieved by applying a piece-wise linear based-function. If input color samples of the mapping process are not in YCbCr domain, color space conversion of input color samples may be applied first. For each color channel an individual piece-wise linear function is signalled, function for Y first, followed by functions for Cb and Cr if applicable.

hdr_recon_id equal to 1 specifies that the mapping applies in the YCbCr domain and RGB domain, and that the mapping of each color sample is achieved by applying a piece-wise linear based-function. The mapping process is first applied on samples of Cr and Cb first, followed by color space conversion to RGB samples, and followed by mapping process applied on R,G and B color samples. A single piece-wise linear function is signalled for R,G and B color channels, followed by signalling of an individual piece-wise linear function for Cr and Cb color channels.

hdr_recon_id equal to 10 specifies that the mapping applies in the YCbCr domain, and that the mapping of each color sample is achieved by applying a piece-wise linear based-function. If input color samples of the mapping process are not in YCbCr domain, color space conversion of input color samples may be applied first. For each color channel an individual piece-wise linear function is signalled, function for Y first, followed by functions for Cb and Cr if applicable.

For hdr_recon_id equal to 0, 1, and 2, the mapping process is based on piece-wise linear functions map[c]( ), for c=0 . . . hdr_recon_num_comps_minus1, that map a value x in[0,1] to a value y=map[c](x) as follows:

For i in the range of 0 to hdr_recon_num_ranges[ c ] − 1, inclusive, the following applies:
    The value ScaleValue[ c ][ i ] is derived as described in semantics of syntax element hdr_recon_scale_val[ c ][ i ].
    The value RangeValue[ c ][ i ] is derived as described in semantics of syntax element hdr_recon_range_val[ c ][ i ].
    The values InputRanges[ c ][ i ] and OutputRanges[ c ][ i ], for i in the range of 0 to hdr_recon_num_ranges[ c ] − 1, inclusive, are derived as follows:
        If i is equal to 0, the following applies:
        OutputRanges[ c ][ i ] = − hdr_recon_global_offset_val[ c ] * ScaleValue[ c ][ i − 1 ]    (D-xx)
        InputRanges[ c ][ i ] = 0    (D-xx)
        Otherwise (i is not equal to 0), the following applies:
        InputRanges[ c ][ i ] = InputRanges[ c ][ i − 1 ] + RangeValue[ c ][ i − 1 ] (D-xx)
        OutputRanges[ c ][ i ] = OutputRanges[ c ][ i − 1 ] +
            RangeValue[ c ][ i − 1 ] * ScaleValue[ c ][ i − 1 ] (D-xx)
    The values OffsetValue[ c ][ i ], for i in the range of 0 to hdr_recon_num_ranges[ c ] − 1, inclusive, are derived as follows:
    OffsetValue[ c ][ i ] = InputRanges[ c ][ i + 1 ] − OutputRanges[ c ][ i + 1 ] ÷
        ScaleValue[ c ][ i − 1 ]    (D-xx)
    The parameter y = map[ c ]( x ) is derived as follows:
        If x is lower than or equal to OutputRanges[ c ][ 0 ], the following applies:
        y = InputRanges[ c ][ 0 ]    (D-xx)
        Otherwise if x is larger than OutputRanges[ c ][ hdr_recon_num_ranges[ c ] ], the following applies:
        y = InputRanges[ c ][ hdr_recon_num_ranges[ c ] ] (D-xx)
        Otherwise, the following applies:
        for( i = 1; i < = hdr_recon_num_ranges[ c ]; i++ )
            if( OutputRanges[ i − 1 ] < x && x < = OutputRanges[ i ] )
                y = x ☐ ScaleValue[ c ][i − 1 ] + OffsetValue[ c ][ i − 1 ]
            (D-xx)

When hdr_recon_id is equal to 0, the mapping process of input samples Yin, Uin, Vin into output samples Yout, Uout, Vout consists of the following equations:

$Y\text{out}=\text{map}[0](Y\text{in})$ $U\text{out}=\text{map}[1](U\text{in})$ $V\text{out}=\text{map}[2](V\text{in})$ When hdr_recon_id equal to 1, the mapping process of input samples Uin, Vin, Rin, Gin, Bin into output samples Uout, Vout, Rout, Gout, Bout consist of the following equations:

$U\text{out}=\text{map}[1](U\text{in})$ $V\text{out}=\text{map}[2](V\text{in})$ $R\text{out}=\text{map}[0](R\text{in})$ $G\text{out}=\text{map}[0](G\text{in})$ $B\text{out}=\text{map}[0](B\text{in})$ When hdr_recon_id equal to 2, the mapping process of input samples Rin, Gin, Bin into output samples Rout, Gout, Bout consist of the following equations (considering normalized values in [0, 1]):

Y is derived from Rin, Gin, Bin using the matrix coefficients as described in Table E.5

$T=\max(hdr\_recon\_weight[0]*R\text{in}, hdr\_recon\_weight[1]*G\text{in}, hdr\_recon\_weight[b\ 2]*B\text{in}, hdr\_recon\_weight[3]*Y)$ $w=\text{map}[0](T\text{in})/T\text{in}$ $R\text{out}=\text{Clip3}(0,1,w*R\text{in})$ $G\text{out}=\text{Clip3}(0,1,w*G\text{in})$ $B\text{out}=\text{Clip3}(0,1,w*B\text{in})$ hdr_recon_id equal to 10 specifies that the mapping applies in the YCbCr domain and the mapping process is defined in fixed point representation.

The mapping of sample x from component c to sample y=map[c](x) is specified as follows:

Set the value of DefaultPrecShift equal to 9

Let the variables minSampleVal and maxSampleVal denote the minimum and the maximum sample values as defined by the sample range of the content.

The variable ScaleValue[c][i], for i in the range of 0 to hdr_recon_num_ranges[c]−1, inclusive, is derived as follows:

```
SignValue[ c ][ i ] = 0 // 0 for positive, 1 for negative
hdrReconScaleBitDepth = hdr_recon_scale_bit_depth −
(hdr_negative_scales_present_flag) ? 1 : 0
if( hdr_negative_scales_present_flag )
                ScaleValue[ c ][ i ] = hdr_recon_scale_val[ c ][ i ] & ( (1 <<
hdrReconScaleBitDepth ) − 1 ) (D-xx)
                SignValue[ c ][ i ] = hdr_recon_scale_val[ c ][ i ] & ( 1 <<
hdrReconScaleBitDepth )
else
                ScaleValue[ c ][ i ] = hdr_recon_scale_val[ c ][ i ]       (D-xx)
shiftInvScale = 1 << hdrReconScaleBitDepth
InvScaleValue[ c ][ i ] = ( 1 << (DefaultPrecShift + hdrReconScaleBitDepth) +
                shiftInvScale ) / ScaleValue[ c ][ i ]
    The variable RangeValue[ c ][ i ], for i in the range of 0 to
hdr_recon_num_ranges[ c ] − 1, inclusive, is derived as follows:
                If hdr_recon_equal_ranges_flag[ c ] is equal to 0, the following applies:
                    RangeValue[ c ][ i ] = hdr_recon_range_val[ c ][ i ]       (D-xx)
                Otherwise ( hdr_recon_equal_ranges_flag[ c ] is equal to 1 ), the following
applies:
                    RangeValue [ c ][ i ] = ( ( InputDynamicRangeValue <<
                            hdr_recon_offset_frac_bit_depth ) + ( ( hdr_recon_num_ranges[ c ] +
                            1 ) >> 1 ) ) / hdr_recon_num_ranges[ c ]       (D-xx)
    where InputDynamicRangeValue is equal to 1 when the sample range is
normilized from 0 to 1.
    The variables InputRanges[ c ][ i ] and OutputRanges[ c ][ i ], for i in the range
of 0 to hdr_recon_num_ranges[ c ], inclusive, are derived as follows:
      If i is equal to 0, the following applies:
        OutputRanges[ c ][ i ] = − hdr_recon_global_offset_val[ c ] *
            InvScaleValue[ c ][ i − 1 ](D-xx)
        InputRanges[ c ][ i ] = 0       (D-xx)
      Otherwise (i is not equal to 0), the following applies:
        InputRanges[ c ][ i ] = InputRanges[ c ][ i − 1 ] + RangeValue[ c ][ i − 1 ]
        (D-xx)
        OutputRanges[ c ][ i ] = OutputRanges[ c ][ i − 1 ] +
                Range Value[ c ][ i − 1 ] * InvScaleValue[ c ][ i − 1 ]
                (D-xx)
    The parameters OffsetValue[ c ][ i ], for i in the range of 0 to
hdr_recon_num_ranges[ c ] − 1, inclusive, are derived as follows:
                precOffsetDeltaBits = DefaultPrecShift +
    hdr_recon_scale_frac_bit_depth
    OffsetValue[ c ][ i ] = InputRanges[ c ][ i + 1 ] * (1 << precOffsetDeltaBits) −
                                        OutputRanges[ c ][ i + 1 ] * ScaleValue[ c ][ i − 1 ]
                                        (D-xx)
    OffsetValue[ c ][ i ] = ( ( OffsetValue[ c ][ i ] + ( 1 << (BitDepth − 1) ) ) >>
                                        BitDepth ) * ( maxSampleVal − minSampleVal )
    The parameter y = map[ c ]( x ) is derived as follows:
                Variable bitDepthDelta is set equal to DefaultPrecShift +
                hdr_recon_offset_frac_bit_depth − BitDepth
```

```
            If ( x << bitDepthDelta ) is lower than or equal to OutputRanges[ c ][ 0 ],
the following applies:
    y = InputRanges[ c ][ 0 ]                                                    (D-xx)
        fracBitDepth = hdr_recon_offset_frac_bit_depth
        Otherwise if ( x << bitDepthDelta ) is larger than
OutputRanges[ c ][ hdr_recon_num_ranges[ c ] ], the following applies:
    y = InputRanges[ c ][ hdr_recon_num_ranges[ c ] ]                            (D-xx)
        fracBitDepth = hdr_recon_offset_frac_bit_depth
        Otherwise, the following applies:
                    fracBitDepth = DefaultPrecShift + hdr_recon_scale_frac_bit_depth +
hdr_recon_offset_frac_bit_depth - BitDepth
                    for( i = 1; i < = hdr_recon_num_ranges[ c ]; i++ )
                        if( OutputRanges[ i - 1 ] < ( x << bitDepthDelta ) &&
                                ( x << bitDepthDelta ) < = OutputRanges[ i ] ) {
                            rangeBitShift = DefaultPrecShift +
hdr_recon_offset_frac_bit_depth - BitDepth
                                y = ( x - minSampleVal ) * ScaleValue[ c ][ i - 1 ] * ( 1 <<
rangeBitDepth ) +
                                    OffsetValue[ c ][ i - 1 ] +
                                    minSampleVal * ( 1 << fracBitDepth ) (D-xx)
                    }
    fracShiftOffset = 1 << (fracBitDepth - 1)
    y = ( y + fracShiftOffset ) >> fracBitDepth
``` hdr_recon_cancel_flag equal to 1 indicates that the HDR reconstruction information SEI message cancels the persistence of any previous HDR reconstruction information SEI message in output order that applies to the current layer. hdr_recon_cancel_flag equal to 0 indicates that HDR reconstruction information follows.

hdr_recon_persistence_flag specifies the persistence of the HDR reconstruction information SEI message for the current layer.

hdr_recon_persistence_flag equal to 0 specifies that the HDR reconstruction information applies to the current picture only.

Let picA be the current picture. hdr_recon_persistence_flag equal to 1 specifies that the HDR reconstruction information persists for the current layer in output order until either of the following conditions is true:

A new CLVS of the current layer begins.

The bitstream ends.

A picture picB in the current layer in an access unit containing a HDR reconstruction information SEI message with the same value of hdr_recon_id and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

hdr_recon_transfer_characteristics has the same semantics as specified in clause E.3.1 for the transfer_characteristics syntax element, except that hdr_recon_transfer_characteristics specifies the color space of the reconstructed HDR picture, rather than the color space used for the CLVS. When not present, the value of hdr_recon_transfer_characteristics is inferred to be equal to the value of transfer_characteristics.

hdr_recon_default_flag equal to 0 indicates that accuracy of representation of the HDR reconstruction parameters set is different from default and is signalled explicitly. hdr_recon_default_flag equal to 1 indicates that default accuracy for HDR reconstruction parameters are used.

hdr_recon_scale_bit_depth specifies the number of bits used to signal the syntax element hdr_recon_scale_val[c][i]. The value of hdr_recon_scale_bit_depth shall be in the range of 0 to 15, inclusive. Default value is determined from Table X hdr_recon_offset_bit_depth specifies the number of bits used to signal the syntax elements hdr_recon_global_offset_val[c] and hdr_recon_offset_val[c][i]. The value of hdr_recon_offset_bit_depth shall be in the range of 0 to 15, inclusive. Default value is determined from Table X hdr_recon_scale_frac_bit_depth specifies the number of LSBs used to indicate the fractional part of the scale parameter of the i-th partition of the c-th component. The value of hdr_recon_scale_frac_bit_depth shall be in the range of 0 to 15, inclusive. The value of hdr_recon_scale_frac_bit_depth shall be less than or equal to the value of hdr_recon_scale_bit_depth. Default value is determined from Table X hdr_recon_offset_frac_bit_depth specifies the number of LSBs used to indicate the fractional part of the offset parameter of the i-th partition of the c-th component and global offset of the c-th component. The value of hdr_recon_offset_frac_bit_depth shall be in the range of 0 to 15, inclusive. The value of hdr_recon_offset_frac_bit_depth shall be less than or equal to the value of hdr_recon_offset_bit_depth. Default value is determined from Table X.E.6 hdr_recon_num_comps_minus1 plus 1 specifies the number of components for which the component scaling function is specified. hdr_recon_num_comps_minus1 shall be in the range of 0 to 2, inclusive. Default value is determined from Table X hdr_recon_num_ranges[c] specifies the number of ranges in to which the output sample range is partitioned in to. The value of hdr_recon_num_ranges[c] shall be in the range of 0 to 63(32), inclusive.

hdr_negative_scales_present_flag equal to 0 indicates that the MSB bit of hdr_recon_scale_val does not specify the sign of the value of hdr_recon_scale_val. hdr_negative_scales_present_flag equal to 1 indicates that the MSB bit of hdr_reconv_scale_val specifies the sign of the value of hdr_recon_scale_val.

hdr_recon_equal_ranges_flag[c] equal to 1 indicates that that output sample range is partitioned into hdr_recon_num_ranges[c] nearly equal partitions, and the partition widths are not explicitly signalled. hdr_recon_equal_ranges_flag[c] equal to 0 indicates that that output sample range may be partitioned into hdr_recon_num_ranges[c] partitions not all of which are of the same size, and the partitions widths are explicitly signalled.

hdr_recon_global_offset_val[c] is used to derive the offset value that is used to map the smallest value of the valid input data range for the c-th component. The bit-depth of hdr_recon_global_offset_val[c] is hdr_recon_offset_bit_depth bits.

hdr_recon_scale_val[c][i] is used to derive the offset value that is used to derive the width of the of the i-th partition of the c-th component. The bit-depth of hdr_recon_scale_val[c] is hdr_recon_scale_bit_depth bits. The variable ScaleValue[c][i] is derived as follows:

ScaleValue[c][i]=(hdr_recon_scale_val[c]
  [i]>>hdr_recon_scale_frac_bit_depth)+(hdr_re-
  con_scale_val[c][i]&((1<<hdr_recon_scale_
  frac_bit_depth)−1))÷(1<<hdr_recon_scale_
  frac_bit_depth)   (D-xx)

hdr_recon_range_val[c][i] is used to derive the width of the of the i-th dynamic range partition of the c-th component that is used to derive the offset value for the i-th dynamic range partition of the c-th component. The bit-depth of hdr_recon_range_val[c] is hdr_recon_offset_bit_depth bits. The variable RangeValue[ c ][ i ] is derived as follows:

If hdr_recon_equal_ranges_flag[c] is equal to 0, hdr_recon_range_val[c][i] is signalled, and the value of RangeValue[c][i] is derived as follows:

RangeValue[c][i]=(hdr_recon_range_val[c]
  [i]>>hdr_recon_offset_frac_bit_depth)+
  (hdr_recon_range_val[c][i]&
  ((1<<hdr_recon_offset_frac_bit_depth)−1))÷
  (1<<hdr_recon_offset_frac_bit_depth)

Otherwise (hdr_recon_equal_ranges_flag[c] is equal to 1), hdr_recon_range_val[c][i] is not signalled, and the value of RangeValue[c][i] is derived as follows:

The value InputDynamicRangeValue is derived as follows:

When the sample range is normalized from 0 to 1, InputDynamicRangeValue is set equal to 1.

Otherwise, InputDynamicRangeValue is set equal to max-SampleVal-minSampleVal.

The value RangeValue[c][i] is derived as follows:

RangeValue[c][i]
  =InputDynamicRangeValue÷hdr_recon_num_ranges[c]   (D-xx)

TABLE X

| Specification of default values signaled parameters | | | |
| --- | --- | --- | --- |
| hdr_recon_id | 0 | 1 | 10 |
| hdr_recon_scale_bit_depth | 8 | 8 | 8 |
| hdr_recon_offset_bit_depth | 8 | 8 | 8 |
| hdr_recon_scale_frac_bit_depth | 6 | 6 | 6 |
| hdr_recon_offset_frac_bit_depth | 8 | 8 | 8 |
| hdr_recon_num_comps_minus1 | 2 | 2 | 2 |

Figure 18:
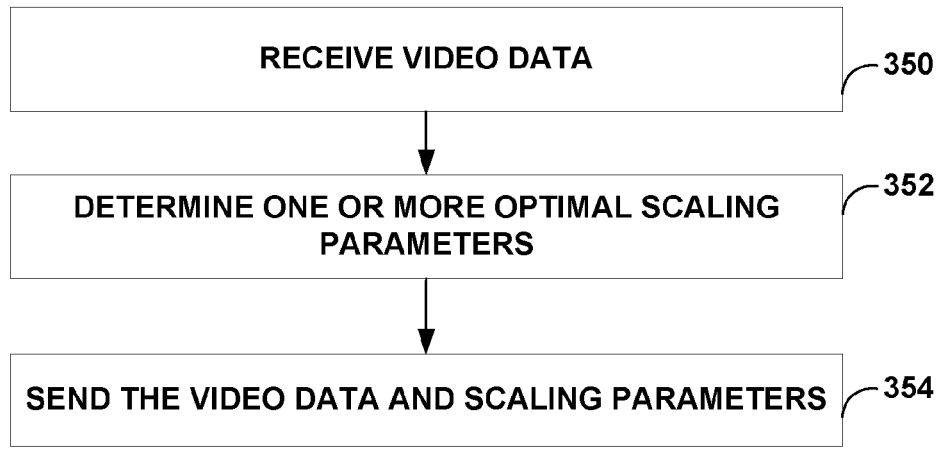
FIG. 18 is a flowchart illustrating an example method of video processing in an HDR and WCG coding architecture with SDR backwards compatibility in a single bitstream.

FIG. 18 is a flowchart illustrating an example method according to the techniques of this disclosure. In one example of the disclosure, video preprocessor 19 and/or video encoding unit 21 of source device 12 may be configured to receive video data (350). In one example the video data may be received, a non-standard dynamic range compatible coding transfer function (e.g., from a ST. 2084 Inverse EOTF (such as, inverse EOTF 210, or an RGB to YCbCr converter (e.g., RGB to YCbCr converter 214). In another example, the video data may be received from a video capture device. The video data may include HDR and/or WCG video data. The video data may include a plurality of color components (e.g., R, B, G, Y, Cb, or Cr).

Video preprocessor 19 and/or video encoding unit 21 of source device 12 may be configured to determine one or more optimal scaling parameters (352). The optimal scaling parameters may be configured to that minimize a difference between a reference tone mapping and a piece-wise linear mapping of the video data. Determining the one or more optimal scaling parameters may include determining a number of partitions of the dynamic range of the video data and the partitions of the video data. The one or more scaling parameters may be configured to control HDR construction when decoded. The scaling parameters may include scaling parameters for a plurality of color components. The reference tone mapping may map portions of the dynamic range of the HDR video data for playback on a standard dynamic range (SDR)-compatible device. Video preprocessor 19 and/or video encoding unit 21 of source device 12 may determine a second set of scaling parameters configured to provide color volume correction for Cb and Cr chromaticity.

Video preprocessor 19 and/or video encoding unit 21 of source device 12 may be configured to send the video data and scaling parameters (354). The video data and scaling parameters may be send to a decoder (e.g., decoder 20) or to a destination device (e.g., destination device 14). Prior to sending to a destination device, the video data and scaling parameters may be encoded (e.g., by video encoder 20).

Figure 19:
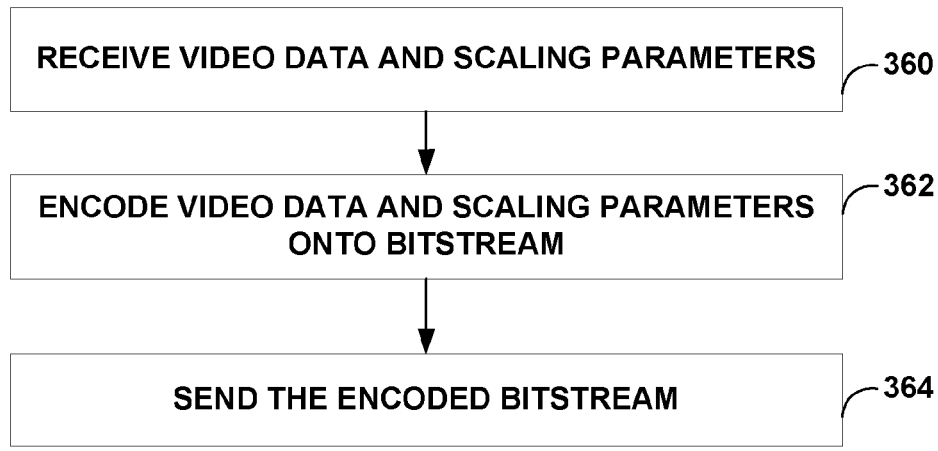
FIG. 19 is a flowchart illustrating an example method of video processing in an HDR and WCG coding architecture with SDR backwards compatibility in a single bitstream.

FIG. 19 is a flowchart illustrating an example method according to the techniques of this disclosure. In one example of the disclosure, encoder 20 and/or video encoding unit 21 of source device 12 may be configured to receive video data and scaling parameters. (360) The video data and scaling parameters may be received from a video preprocessor (e.g., video preprocessor 19) or a dynamic range adjustment (DRA) unit.

Encoder 20 and/or video encoding unit 21 of source device 12 may be configured to encode video data and scaling parameters onto a bitstream (362). Encoding may comprise encoding the HDR or WCG video data and the one or more scaling parameters onto a single bitstream. The single bitstream compatible for playback on a HDR or WCG compatible device and a standard dynamic range (SDR) or standard color gamut (SCG) device. Encoding the one or more scaling parameters may comprise encoding the one or more scaling parameters in one or more Supplemental Enhancement Information (SEI) messages.

Encoder 20 and/or video encoding unit 21 of source device 12 may be configured to send the encoded bitstream (364). The encoded bitstream may be sent to a destination device (e.g., destination device 14).

Figure 20:
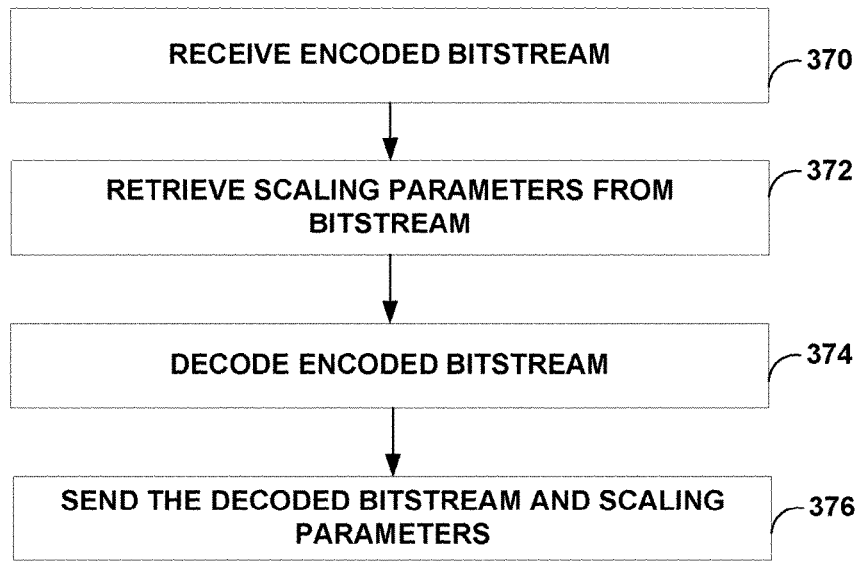
FIG. 20 is a flowchart illustrating an example method of video processing in an HDR and WCG coding architecture with SDR backwards compatibility in a single bitstream.

FIG. 20 is a flowchart illustrating an example method according to the techniques of this disclosure. In one example of the disclosure, decoder 30 and/or video decoding unit 29 of destination device 14 may be configured to receive an encoded bitstream (370). Decoder 30 and/or video decoding unit 29 of destination device 14 may be configured to retrieve scaling parameters from the bitstream (372). Retrieving the scaling parameters may include retrieving the one or more scaling parameters from (and decoding) one or more Supplemental Enhancement Information (SEI) messages. Decoder 30 and/or video decoding unit 29 of destination device 14 may be configured to decode the encoded bitstream (374). Decoder 30 and/or video decoding unit 29 of destination device 14 may be configured to send the decoded bitstream and scaling parameters (376). The decoded bitstream may be sent to a video postprocessor (e.g., video postprocessor 31) or for display (on e.g., display device 32).

Figure 21:
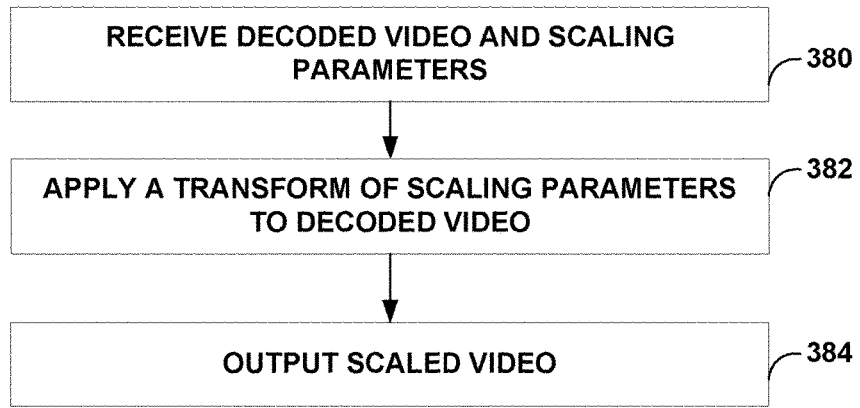
FIG. 21 is a flowchart illustrating an example method of video processing in an HDR and WCG coding architecture with SDR backwards compatibility in a single bitstream.

FIG. 21 is a flowchart illustrating an example method according to the techniques of this disclosure. In one example of the disclosure, video postprocessor 31 and/or video decoding unit 29 of destination device 14 may be configured to receive decoded video and scaling parameters (380). The decoded video may be received from a video decoder (e.g., decoder 30). The decoded video data may include high dynamic range (HDR) or wide color gamut (WCG) video data in a standard dynamic range (SDR) or standard color gamut (SCG) representation compatible with SDR or SCG devices.

Video postprocessor 31 and/or video decoding unit 29 of destination device 14 may be configured to apply a transform of scaling parameters to the decoded video (382). The transform may be configured to scale an SDR or SCG representation for display on an HDR or WCG compatible display. The transform may be applied separately to each of the plurality of color components of the decoded video data. The transform may include applying the transform separately to each partition of a piece-wise linear mapping of the video data.

Video postprocessor 31 and/or video decoding unit 29 of destination device 14 may be configured to output the scaled video (384). The scaled video may be output for display on a display device (e.g., display device 32). The display may be an HDR or WCG compatible display.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding video data and a plurality of scaling parameters of an encoded bitstream, wherein the plurality of scaling parameters is configured to transform components of the video data using a piece-wise linear mapping of the video data, wherein the video data comprises at least one of a standard dynamic range (SDR) or standard color gamut (SCG) representation compatible with SDR or SCG devices, and wherein decoding the video data and the plurality of scaling parameters comprises:
        applying an inverse second dynamic range adjustment (DRA) to YCbCr samples based on the plurality of scaling parameters according to a histogram mapping of Cb and Cr parameters of the video data;
        transforming the YCbCr samples to RGB samples; and
        performing an inverse first DRA to the RGB samples based on the plurality of scaling parameters which model a first adjustment according to a mapping of a combined inverse gamma and hybrid log gamma (HLG) electro-optical transfer function (EOTF) curves to a Perceptual Quantization (PQ) transfer function (TF) curve; and outputting the decoded bitstream video data and the plurality of scaling parameters.

2. The method of claim 1, further comprising applying the plurality of scaling parameters separately to each partition of the piece-wise linear mapping of the video data.

3. The method of claim 1, further comprising separately applying the plurality of scaling parameters to each of a plurality of color components of the video data.

4. The method of claim 1, further comprising transforming components of the video data, the components comprising the plurality of scaling parameters configured to reconstruct at least one of a high dynamic range (HDR) or wide color gamut (WCG) signal from the at least one of SDR or SCG representation for display on at least one of an HDR or WCG compatible display.

5. The method of claim 1, wherein decoding the encoded bitstream comprises decoding one or more Supplemental Enhancement Information (SEI) messages indicative of the plurality of scaling parameters.

6. The method of claim 1, further comprising transforming components of the video data prior to a conversion of the video data from a YCbCr color format to an RGB color format.

7. A device for decoding video content, the device comprising:
  a memory configured to store an original video; and
  one or more processors in communication with the memory and are configured to:
    decode video data and a plurality of scaling parameters of an encoded bitstream, wherein the plurality of scaling parameters is configured to transform components of the video data using a piece-wise linear mapping of the video data, wherein the video data comprises at least one of a standard dynamic range (SDR) or standard color gamut (SCG) representation compatible with SDR or SCG devices, and wherein to decode the video data and plurality of scaling parameters, the one or more processors are configured to:
      apply an inverse second dynamic range adjustment (DRA) to YCbCr samples based on the plurality of scaling parameters according to a histogram mapping of Cb and Cr parameters of the video data;
      transform the YCbCr samples to RGB samples; and
      perform an inverse first DRA to the RGB samples based on the plurality of scaling parameters which model a first adjustment according to a mapping of a combined inverse gamma and hybrid log gamma (HLG) electro-optical transfer function (EOTF) curves to a Perceptual Quantization (PQ) transfer function (TF) curve; and
    output the decoded bitstream video data and the plurality of scaling parameters.

8. The device of claim 7, wherein the processors are configured to apply the plurality of scaling parameters separately to each partition of the piece-wise linear mapping of the video data.

9. The device of claim 7, wherein the processors are configured to apply the plurality of scaling parameters separately to each of a plurality of color components of the video data.

10. The device of claim 7, wherein the processors are configured to transform components of the video data using the plurality of scaling parameters and reconstruct at least one of a high dynamic range (HDR) or wide color gamut (WCG) signal from the at least one of SDR or SCG representation for display on at least one of an HDR or WCG compatible display based on the transformed components.

11. The device of claim 7, wherein to decode the encoded bitstream, the one or more processors configured to decode one or more Supplemental Enhancement Information (SEI) messages indicative of the plurality of scaling parameters.

12. The device of claim 7, wherein the processors are configured to transform components of the video data using the plurality of scaling parameters prior to a conversion of the video data from a YCbCr color format to an RGB color format.

13. The device of claim 7, further comprising a display configured to display the decoded bitstream video data according to the plurality of scaling parameters.

14. The device of claim 7, wherein the device comprises one or more of a camera, a computer, a mobile device, a broadcast receiver device, or a set-top box.

* * * * *